United States Patent
Yamamoto et al.

(10) Patent No.: US 8,117,211 B2
(45) Date of Patent: Feb. 14, 2012

(54) INFORMATION PROCESSING DEVICE AND METHOD, AND PROGRAM

(75) Inventors: Noriyuki Yamamoto, Kanagawa (JP); Kei Tateno, Kanagawa (JP); Mari Saito, Kanagawa (JP); Tomohiro Tsunoda, Tokyo (JP); Mitsuhiro Miyazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 391 days.

(21) Appl. No.: 11/791,361

(22) PCT Filed: Sep. 15, 2006

(86) PCT No.: PCT/JP2006/318373
§ 371 (c)(1),
(2), (4) Date: Oct. 16, 2008

(87) PCT Pub. No.: WO2007/037139
PCT Pub. Date: Apr. 5, 2007

(65) Prior Publication Data
US 2009/0077132 A1    Mar. 19, 2009

(30) Foreign Application Priority Data

Sep. 28, 2005 (JP) ................................. 2005-281357
May 31, 2006 (JP) ................................. 2006-151012

(51) Int. Cl.
G06F 7/00 (2006.01)
G06F 17/30 (2006.01)
(52) U.S. Cl. .......................... 707/749; 707/751; 707/916
(58) Field of Classification Search .................. 707/999.101–999.105, 999.01, 707/999.1, 749, 751, 999.001–999.005
See application file for complete search history.

(56) References Cited

U.S. PATENT DOCUMENTS

| | | | |
|---|---|---|---|
| 2003/0033370 A1* | 2/2003 | Trotta | 709/204 |
| 2004/0176958 A1* | 9/2004 | Salmenkaita et al. | 704/275 |
| 2005/0125307 A1* | 6/2005 | Hunt et al. | 705/26 |
| 2006/0082437 A1 | 4/2006 | Yuhara | |
| 2006/0129547 A1 | 6/2006 | Yamamoto et al. | |
| 2006/0248091 A1 | 11/2006 | Yamamoto et al. | |

FOREIGN PATENT DOCUMENTS

| | | |
|---|---|---|
| JP | 2003-216636 | 7/2003 |
| JP | 2004-178521 | 6/2004 |
| JP | 2004-192460 | 7/2004 |
| JP | 2004-192461 | 7/2004 |
| JP | 2004-194107 | 7/2004 |
| JP | 2004-194108 | 7/2004 |
| JP | 2004-355340 | 12/2004 |

* cited by examiner

*Primary Examiner* — Mohammad Ali
*Assistant Examiner* — Kannan Shanmugasundaram
(74) *Attorney, Agent, or Firm* — Finnegan, Henderson, Farabow, Garrett & Dunner, L.L.P.

(57) ABSTRACT

The present invention relates to an information processing device, an information processing method, and a computer-readable storage medium storing a program for selecting a content by classifying content included in a group into one of a plurality of clusters included in layers arranged based on metadata of the contents, the layers being assigned priority levels including a high priority level and low priority level, retaining a database indicating a correspondence between the classified content, the clusters corresponding to the classified content, and the layers, managing history information corresponding to contents of the user, identifying a cluster on a basis of the history information, and selecting a content classified into a layer of the identified cluster based on a priority level of the layer, and presenting the selected content and description information, the description indicating a reason for selection of the selected content.

9 Claims, 24 Drawing Sheets

FIG. 3

| MUSICAL PIECE ID | FIRST LAYER | SECOND LAYER | THIRD LAYER | FOURTH LAYER | FIFTH LAYER | ... | nTH LAYER |
|---|---|---|---|---|---|---|---|
| ABC123 | CL12 | CL21 | CL35 | CL47 | CL52 | ... | CLn2 |
| CTH863 | CL11 | CL25 | CL31 | CL42 | CL53 | ... | CLn1 |
| XYZ567 | CL12 | CL24 | CL32 | CL41 | CL54 | ... | CLn4 |
| ... | | | | | | | |

FIG. 4

| | CLUSTER-MUSICAL PIECE ID | | | | | |
|---|---|---|---|---|---|---|
| | CLi1 | CLi2 | CLi3 | CLi4 | CLi5 | CLi6 |
| FIRST LAYER | CTH863 | ABC123<br>XYZ567 | | | | |
| SECOND LAYER | ABC123 | | | XYZ567 | CTH863 | |
| THIRD LAYER | CTH863 | XYZ567 | | | ABC123 | |
| FOURTH LAYER | XYZ567 | CTH863 | CTH863 | XYZ567 | | |
| FIFTH LAYER | | ABC123 | | | | |

FIG.5A

| PREFERENCE VECTOR OF USER A | CL11 | CL12 | CL13 | CL21 | CL22 | CL23 | CL24 | CL31 | CL32 | CL33 | CL41 | CL42 | CL43 |
|---|---|---|---|---|---|---|---|---|---|---|---|---|---|
| | 1 | 1 | 0 | 0 | 1 | 0 | 1 | 0 | 1 | 1 | 1 | 0 | 1 |

FIG.5B

| PREFERENCE VECTOR OF USER X | CL11 | CL12 | CL13 | CL21 | CL22 | CL23 | CL24 | CL31 | CL32 | CL33 | CL41 | CL42 | CL43 |
|---|---|---|---|---|---|---|---|---|---|---|---|---|---|
| | 1 | 1 | 1 | 0 | 2 | 0 | 1 | 0 | 1 | 2 | 1 | 1 | 1 |

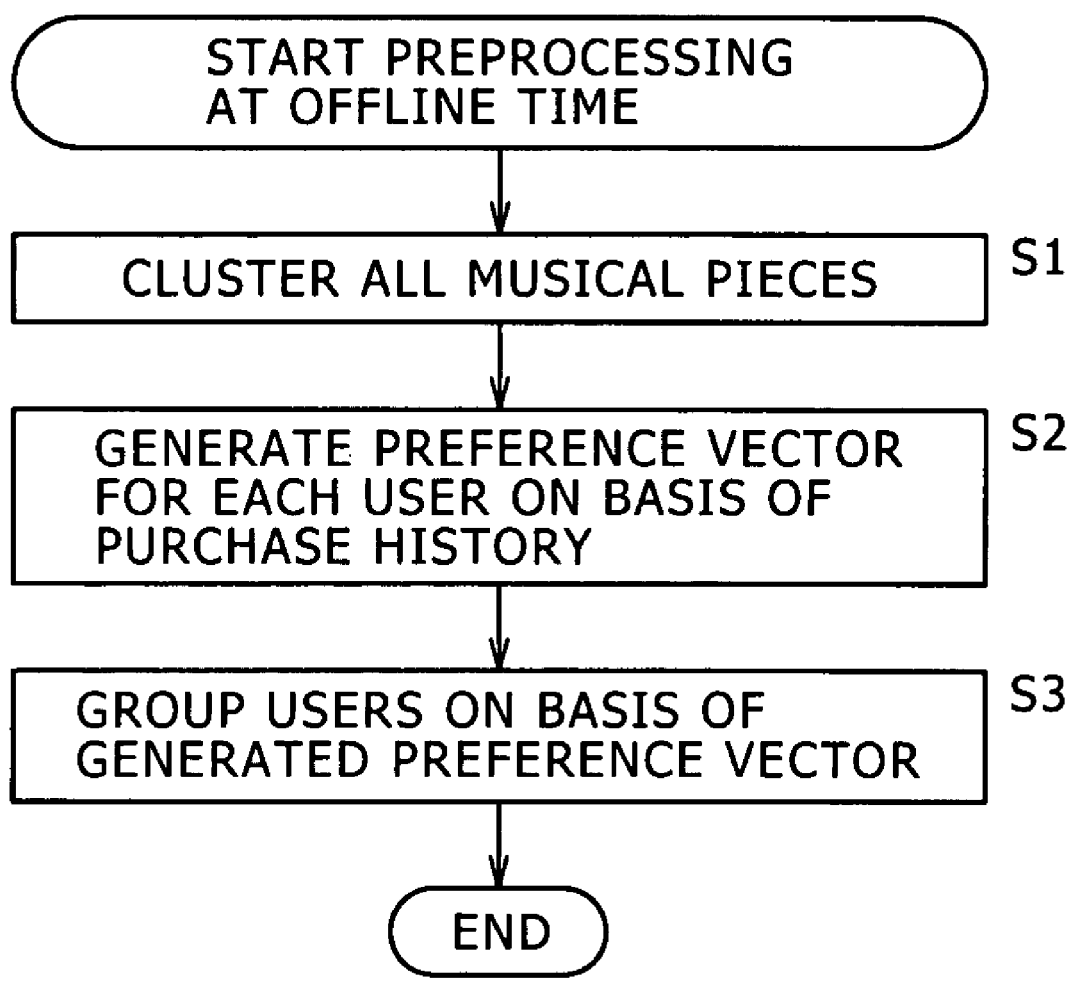

FIG. 15

| MUSICAL PIECE ID | FIRST LAYER | | | | SECOND LAYER | | | | THIRD LAYER | | | | ... | nTH LAYER | | | | |
|---|---|---|---|---|---|---|---|---|---|---|---|---|---|---|---|---|---|---|
| ABC123 | 0 | 0.8 | 0 | 0.2 | 0.4 | 0.6 | 0 | 0 | 0 | 0 | 0 | 1 | | 1 | 0 | 0 | 0 | |
| CTH863 | 1 | 0 | 0 | 0 | 0 | 0.5 | 0.5 | 0 | 0.7 | 0.3 | 0 | 0 | | 0 | 0.8 | 0.2 | 0 | |
| XYZ567 | 0 | 0.4 | 0.6 | 0 | 0 | 0 | 0 | 1 | 0.9 | 0 | 0.1 | | | 0.3 | 0 | 0 | 0.7 | |
| ... | | | | | | | | | | | | | | | | | | |

FIG.16

| MUSICAL PIECE ID | META-GROUP 1 | | | META-GROUP 2 | | | ... |
| --- | --- | --- | --- | --- | --- | --- | --- |
| | METADATA 1 | METADATA 2 | METADATA 3 | METADATA 4 | METADATA 5 | METADATA 6 | |
| ABC123 | 1 | 1 | 1 | 1 | 1 | 1 | |
| CTH863 | 0 | 1 | 0 | 0 | 1 | 1 | |
| XYZ567 | 1 | 1 | 1 | 1 | 1 | 1 | |
| EKF534 | 1 | 0 | 1 | 0 | 0 | 1 | |
| OPQ385 | 1 | 0 | 1 | 1 | 0 | 0 | |
| ... | | | | | | | |

FIG. 17

| MUSICAL PIECE ID | FIRST LAYER | | | | SECOND LAYER | | | |
|---|---|---|---|---|---|---|---|---|
| | METADATA 1 | METADATA 3 | METADATA 4 | METADATA 2 | METADATA 5 | METADATA 6 | ... |
| ABC123 | 1 | 1 | 1 | 1 | 1 | 1 | |
| CTH863 | 0 | 0 | 0 | 1 | 1 | 1 | |
| XYZ567 | 1 | 1 | 1 | 1 | 1 | 1 | |
| EKF534 | 1 | 1 | 0 | 0 | 0 | 1 | |
| OPQ385 | 1 | 1 | 1 | 0 | 0 | 0 | |
| ... | | | | | | | |

FIG.20

| USER ID | FIRST LAYER | | | SECOND LAYER | | | THIRD LAYER | | | FOURTH LAYER | | |
|---|---|---|---|---|---|---|---|---|---|---|---|---|
| U001 | 0 | 2.8 | 2.2 | 0.4 | 0.6 | 0.8 | 0 | 0.5 | 0.4 | 0.4 | 0 | 0.5 | 0.4 | 0 |
| U002 | 0.2 | 0.8 | 0.6 | 0 | 0.5 | 0.5 | 0 | 0.7 | 0.3 | 0.6 | 0 | 0.6 | 0.2 | 0 |
| U003 | 0 | 2.2 | 1.6 | 0 | 1 | 2 | 1.4 | 0 | 1.2 | 0.1 | 0.3 | 0.4 | 0.6 | 0.7 |

FIG.21

| USER ID | FIRST LAYER | | | SECOND LAYER | | | THIRD LAYER | | | FOURTH LAYER | | |
|---|---|---|---|---|---|---|---|---|---|---|---|---|
| U001 | 0 | 0.8 | 0 | 0.6 | 0.4 | 0.6 | 0.7 | 0 | 0.7 | 0.5 | 0.5 | 0 | 0.5 | 0.4 | 0 |
| U002 | 0.2 | 0.7 | 0.4 | 0.5 | 0 | 0.7 | 0.7 | 0.7 | 0 | 0.3 | 0.6 | 0 | 0.8 | 0.3 | 0 |
| U003 | 0 | 0.8 | 0 | 0.6 | 0 | 0.4 | 0.8 | 0.5 | 0 | 1 | 0.1 | 0.3 | 0.2 | 0.2 | 0.3 |

FIG.22

| USER ID | FIRST LAYER | SECOND LAYER | THIRD LAYER | FOURTH LAYER |
|---|---|---|---|---|
| U001 | 0.17 | 0.10 | 0.01 | 0.06 |
| U002 | 0.05 | 0.17 | 0.05 | 0.16 |
| U003 | 0.16 | 0.10 | 0.31 | 0.00 |

FIG.23

| USER ID | FIRST LAYER | SECOND LAYER | THIRD LAYER | FOURTH LAYER | SUM OF ALL LAYERS |
|---|---|---|---|---|---|
| U002 | 0.88 | 0.92 | 0.97 | 0.50 | 3.27 |
| U003 | 1.00 | 0.77 | 0.57 | 0.15 | 2.50 |

FIG.24

| USER ID | FIRST LAYER | SECOND LAYER | THIRD LAYER | FOURTH LAYER | SUM OF ALL LAYERS |
|---|---|---|---|---|---|
| U002 | 0.72 | 1.54 | 0.03 | 0.48 | 2.76 |
| U003 | 2.74 | 0.79 | 0.10 | 0.00 | 3.64 |

INFORMATION PROCESSING DEVICE AND METHOD, AND PROGRAM

BACKGROUND

Relevant Field

The present invention relates to an information processing device, an information processing method, and a program, and particularly to an information processing device, an information processing method, and a program that classify contents into clusters, manage characteristics of the contents using the clusters into which the contents are classified, and use the characteristics of the contents in retrieving or recommending a content.

BACKGROUND INFORMATION

Conventionally, an invention for retrieving and recommending contents such as television programs, musical pieces and the like on the basis of preferences of a user (so-called content personalization) has been proposed (see Patent Document 1, for example).

For content personalization, a method referred to as collaborative filtering (CF) and a method referred to as content-based filtering (CBF) are widely used.

The CF method manages a purchase history of each user, detects another user X having a similar purchase history to that of a user A to whom to recommend a content, and recommends a content that the other user X has purchased and which the user A has not purchased. The CF method is employed by mail-order selling sites on the Internet, for example.

The CBF method directly uses metadata given to contents in advance by a distributing side or a selling side in extracting preferences and recommending contents. Specifically, a distance (cosine correlation or the like) between a feature vector indicating preferences of a user and a feature vector of each musical piece as a candidate is calculated, and a musical piece whose calculated distance is short is recommended as musical piece suiting the preferences of the user.

[Patent Document 1]
Japanese Patent Laid-open No. 2004-194107

DISCLOSURE OF THE INVENTION

Problems to be Solved by the Invention

The above-described CF method causes the following inconveniences.

(1) A content not purchased by any user is not recommended to anyone. Therefore, recommendation of contents concentrates on a part of a massive amount of contents prepared, and a remaining large majority of contents are not recommended.

(2) When a content is to be recommended to a new user, there is little information on a purchase history of the user. Therefore, another user having similar history information cannot be detected, and thus a content cannot be recommended (so-called cold start problem).

(3) Generally, the number of contents and the number of users are increased. In this case, an amount of operation when another user having similar history information is detected is increased, so that a content to be recommended cannot be determined quickly.

SUMMARY

The present invention has been made in view of the above, and is to prevent recommendation in the CF method from concentrating on a part of contents, and recommend a content to a user with little history information.

Means for Solving the Problems

According to an aspect of the present invention, there is provided an information processing device for selecting a content satisfying a predetermined condition from a group of contents, and presenting the content to a user, the information processing device including, content classifying means for classifying each content forming the group of contents into one of a plurality of first clusters in each of layers corresponding to metadata of the contents, retaining means for retaining a database indicating a correspondence between each content and the first cluster in the layer into which each content is classified, managing means for managing history information on contents of the user, selecting means for identifying a first cluster of interest on a basis of the history information, and selecting a content classified into the identified first cluster, and presenting means for presenting the selected content.

The selecting means can include detecting means for detecting a second user having similar history information to history information of a first user, identifying means for identifying a first cluster into which a content that is not present on the history information of the first user but is present on the history information of the second user is classified, and extracting means for extracting a content classified into the identified first cluster, and the presenting means can present the extracted content to the first user.

An information processing device according to an aspect of the present invention can further include, generating means for generating preference information indicating preferences of the user in a unit of first clusters on a basis of the history information of the user and the database, and grouping means for grouping users on a basis of the preference information, wherein the selecting means can include detecting means for detecting a second user belonging to a same group as a first user, identifying means for identifying a first cluster into which a content that is not present on history information of the first user but is present on history information of the second user is classified, and extracting means for extracting a content classified into the identified first cluster, and the presenting means can present the extracted content to the first user.

An information processing device according to an aspect of the present invention can further include generating means for generating preference information indicating preferences of the user in a unit of first clusters on a basis of the history information of the user and the database, wherein the selecting means can include detecting means for detecting a second user having similar preferences indicated by preference information to preferences of a first user, identifying means for identifying a first cluster of interest on a basis of preference information of the first user and the preference information of the second user, and extracting means for extracting a content classified into the identified first cluster, and the presenting means can present the extracted content to the first user.

The detecting means can include normalizing means for normalizing the preference information of the user, weight calculating means for calculating a weight of each layer for each user from normalized preference information of each user, and similarity degree calculating means for calculating a degree of similarity indicating a degree of similarity of preferences between a first user of users and another user of the users from the weight of each layer and the preference information, and a second user having similar preferences to preferences of the first user is detected from the calculated degree of similarity.

An information processing device according to an aspect of the present invention can further include, generating means for generating preference information indicating preferences of the user in a unit of first clusters on a basis of the history information of the user and the database, and grouping means for grouping users on a basis of the preference information, wherein the selecting means can include detecting means for detecting a second user belonging to a same group as a first user, identifying means for identifying a first cluster of interest on a basis of preference information of the first user and preference information of the second user, and extracting means for extracting a content classified into the identified first cluster, and the presenting means can present the extracted content to the first user.

An information processing device according to an aspect of the present invention can further include, setting means for setting a keyword to each of the first clusters into which the metadata is classified by the content classifying means, and generating means for generating reason text indicating a reason for presenting the content using the keyword set by the setting means, wherein the presenting means can also present the reason text.

The information processing device can further include metadata classifying means for classifying the metadata of contents into one of a plurality of second clusters, and assigning layers to the second clusters, wherein the content classifying means can classify each content into one of a plurality of first clusters in each of the assigned layers.

The information processing device can further include generating means for generating preference information indicating preferences of the user in a unit of first clusters on a basis of the history information of the user and the database, wherein the selecting means can select a content classified into a largest number of first clusters indicated by the preference information among all the first clusters in all the layers.

According to an aspect of the present invention, there is provided an information processing method of an information processing device for selecting a content satisfying a predetermined condition from a group of contents, and presenting the content to a user, the information processing method including the steps of, classifying each content forming the group of contents into one of a plurality of clusters in each of layers corresponding to metadata of the contents, retaining a database indicating a correspondence between each content and the cluster in the layer into which each content is classified, managing history information on contents of the user. identifying a cluster of interest on a basis of the history information, and selecting a content classified into the identified cluster, and presenting the selected content.

According to an aspect of the present invention, there is provided a program for selecting a content satisfying a predetermined condition from a group of contents, and recommending the content to a user, the program making a computer perform a process including the steps of, classifying each content forming the group of contents into one of a plurality of clusters in each of layers corresponding to metadata of the contents, retaining a database indicating a correspondence between each content and the cluster in the layer into which each content is classified, managing history information on contents of the user, identifying a cluster of interest on a basis of the history information, and selecting a content classified into the identified cluster, and presenting the selected content.

In an aspect of the present invention, each content forming the group of contents is classified into one of a plurality of clusters in each of layers corresponding to metadata of the contents. Then, a database indicating a correspondence between each content and the cluster in the layer into which each content is classified is retained. In addition, history information on contents of the user is managed. Then, a cluster of interest is identified on a basis of the history information, a content classified into the identified cluster is selected, and the selected content is presented.

As described above, according to an aspect of the present invention, a content can be recommended to the user by the CF method.

In addition, according to an aspect of the present invention, it is possible to prevent recommendation from concentrating on a part of all contents.

Further, according to an aspect of the present invention, it is possible to recommend a content to even a user with little history information.

BRIEF DESCRIPTION OF THE DRAWINGS

FIG. 3 is a diagram showing an example of a musical piece-cluster correspondence table.

FIG. 4 is a diagram showing an example of a cluster-musical piece correspondence table.

FIGS. 5A and 5B are diagrams showing an example of preference vectors of users.

FIG. 6 is a flowchart of assistance in explaining preprocessing at an offline time.

FIG. 15 is a diagram showing an example of soft clustered metadata of musical pieces.

FIG. 16 is a diagram showing an example of metadata of musical pieces.

FIG. 17 is a diagram showing an example of the metadata of clustered musical pieces.

FIG. 20 is a diagram showing an example of preference vectors.

FIG. 21 is a diagram showing an example of normalized preference vectors.

FIG. 22 is a diagram showing an example of weights.

FIG. 23 is a diagram showing an example of degrees of similarity calculated without weighting being performed.

FIG. 24 is a diagram showing an example of degrees of similarity calculated with weighting performed.

DETAILED DESCRIPTION 1 recommendation system, 11 musical piece DB, 12 clustering unit, 13 keyword setting unit, 14 clustered DB, 15 cluster-musical piece correspondence table, 16 musical piece-cluster correspondence table, 17 user history information DB, 18 recommendation candidate selecting unit, 19 preference vector generating unit, 20 similar user detecting unit, 21 user grouping unit, 22 difference detecting unit, 23 recommended cluster determining unit, 24 extracting unit, 25 musical piece selecting unit, 26 novelty determining unit, 27 selection reason generating unit, 28 presenting unit, personal computer, 101 CPU, 111 recording medium, 201 metadata clustering unit, 202 musical piece clustering unit, 203 similar user detecting unit, 231 normalizing unit, 232 weight calculating unit, 233 similarity degree calculating unit

BEST MODE FOR CARRYING OUT THE INVENTION

Concrete embodiments to which the present invention is applied will hereinafter be described in detail with reference to the drawings.

Figure 1:
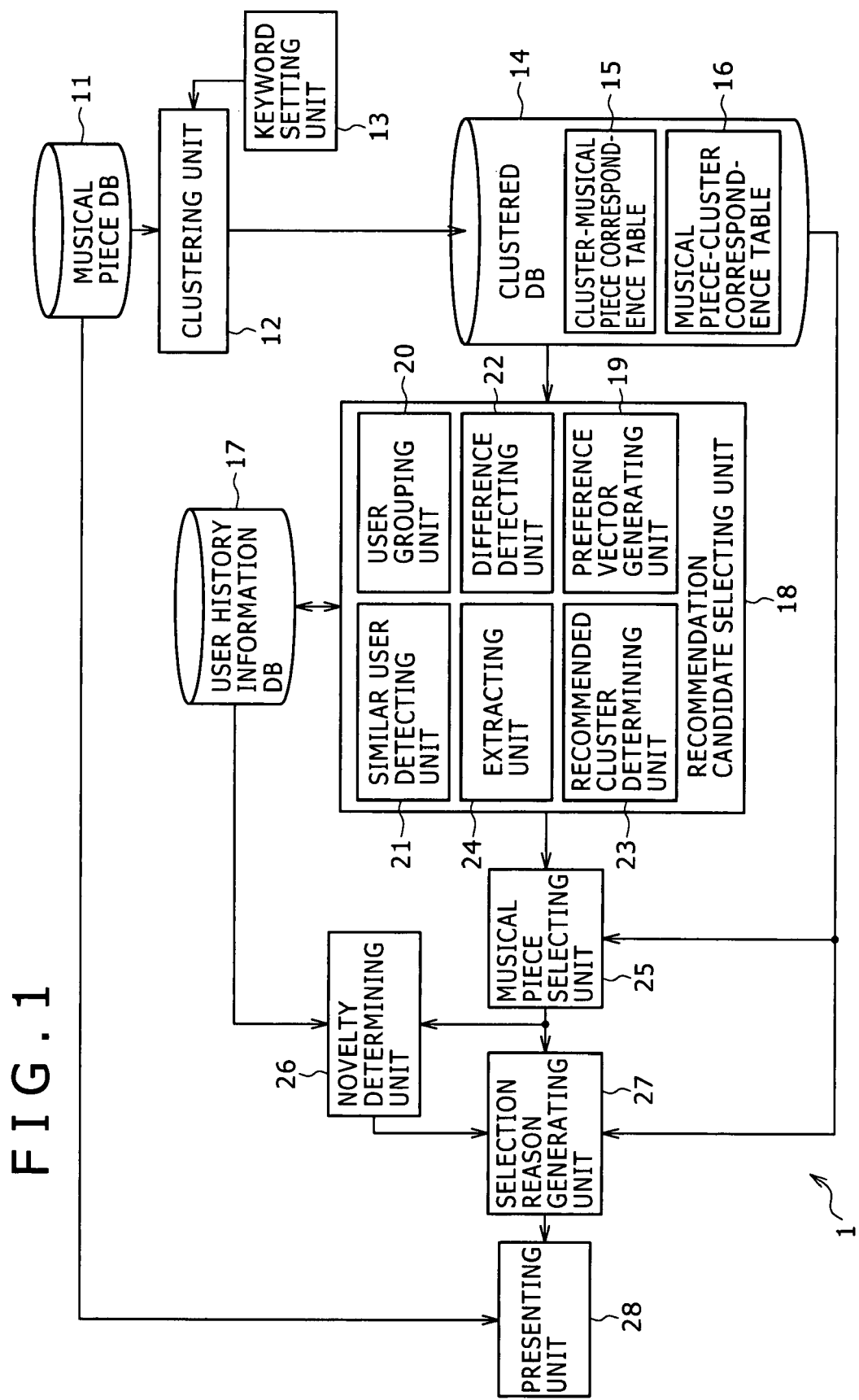
FIG. 1 is a block diagram showing an example of configuration of a recommendation system to which the present invention is applied.

FIG. 1 shows an example of configuration of a recommendation system according to an embodiment of the present invention. In a musical piece data selling site set up on the Internet, for example, the recommendation system 1 manages user history information (information on purchase, trial listening, retrieval, possession and the like of musical piece data), selects a musical piece to be recommended by using a CF method, and presents the musical piece to a user. Incidentally, the recommendation system 1 can also be applied to selling sites selling contents other than musical pieces, for example television programs, movies, books and the like.

The recommendation system 1 includes: a musical piece DB (DB) 11 in which metadata of many pieces of musical piece data (hereinafter also described simply as musical pieces) to be recommended and sold to users is recorded; a clustering unit 12 for clustering musical pieces and generating cluster information of the musical pieces on the basis of the metadata of the musical pieces recorded in the musical piece DB 11; a keyword setting unit 13 for setting a keyword indicating characteristics of each cluster layer and each cluster in the cluster layer; and a clustered DB (DB) 14 retaining a result of the clustering of the musical pieces.

The clustered DB 14 retains, as the clustering result, a cluster-musical piece correspondence table 15 showing musical pieces belonging to each cluster, and a musical piece-cluster correspondence table 16 showing clusters to which each musical piece belongs.

The recommendation system 1 further includes: a user history information database (DB) 17 for managing history information of each user; a recommendation candidate selecting unit 18 for selecting a plurality of musical pieces as recommendation candidates on the basis of user information; a musical piece selecting unit 25 for selecting one musical piece from the plurality of selected musical pieces; a novelty determining unit 26 for determining whether the selected musical piece is new to a user to whom the musical piece is to be recommended; a selection reason generating unit 27 for generating recommendation reason text when the selected musical piece is presented to the user; and a presenting unit 28 for presenting the selected musical piece and the recommendation reason text to the user.

The recommendation candidate selecting unit 18 includes a preference vector generating unit 19, a user grouping unit 20, a similar user detecting unit 21, a difference detecting unit 22, a recommended cluster determining unit 23, and an extracting unit 24.

As with CDDB (CD Data Base), Music Navi and the like as data servers on the Internet which servers supply the metadata of musical pieces recorded on music CDs, the musical piece DB 11 retains the metadata of musical pieces to be recommended and sold.

Figure 2:
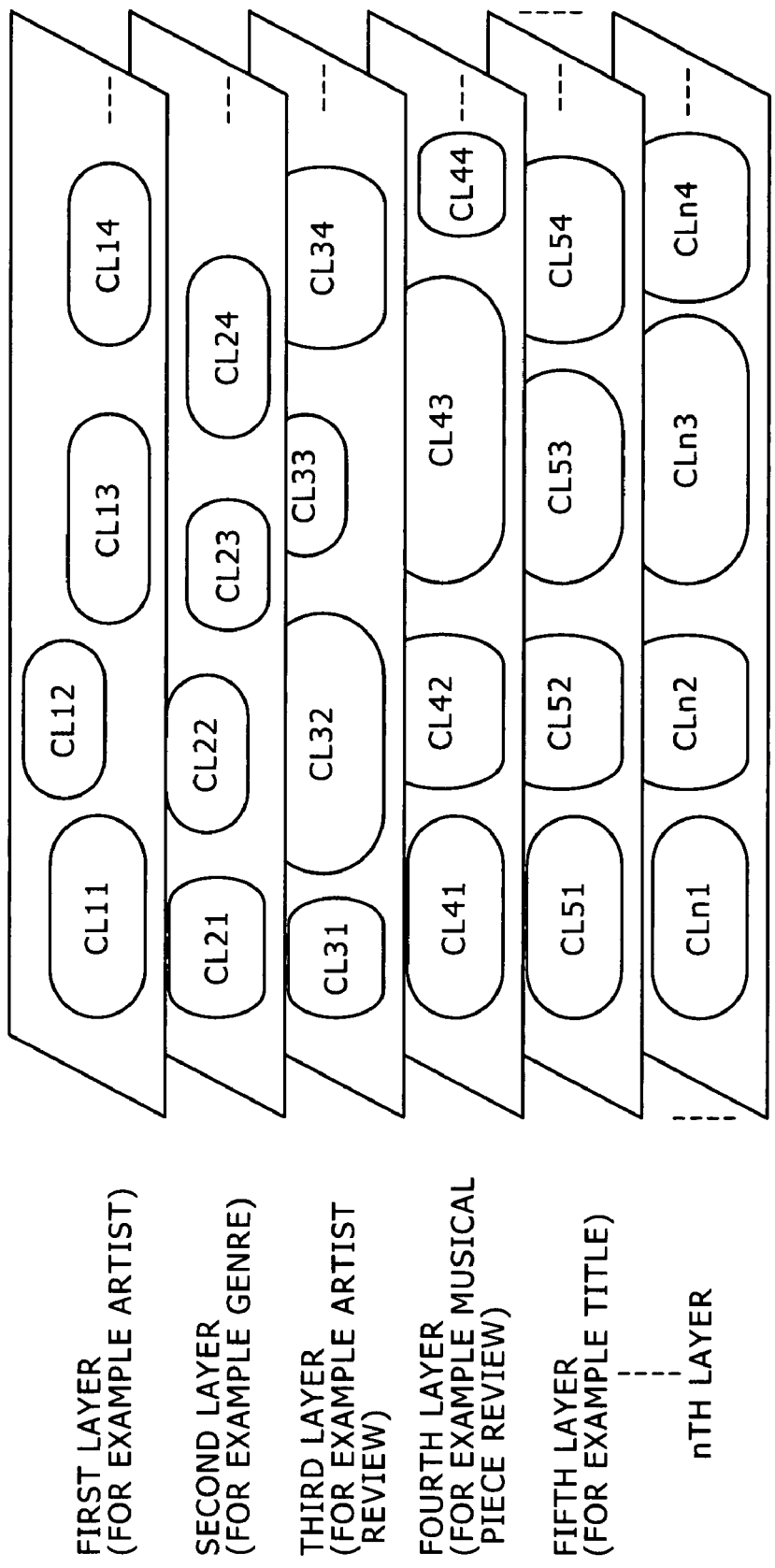
FIG. 2 is a diagram representing a concept of clusters into which metadata of musical pieces is classified and cluster layers.

The clustering unit 12 creates cluster layers (first to nth layers) as shown in FIG. 2 for all musical pieces in the musical piece DB 11 on the basis of each item (artist name, genre, album, artist review, musical piece review, title, tempo, beat, rhythm and the like) of the metadata of the musical pieces or a combination thereof (tempo, beat, rhythm and the like), and classifies a musical piece into one or a plurality of clusters of a plurality of clusters provided in each cluster layer (clustering).

While description has been made above by taking musical pieces as an example, artists and albums are similarly clustered into multiple layers using many meta. For musical piece recommendation, artist recommendation, and album recommendation, multilayer clusters for musical pieces, multilayer clusters for artists, and multilayer clusters for albums are used, respectively.

While any method may be used for clustering, an optimum clustering method and a distance measure are selected for each cluster layer. For example, when actual information of metadata is a numeric attribute such as a tempo or the like, the actual information is used as it is, whereas when the actual information is a nominal attribute such as a title or the like, the actual information is converted into a numerical value using a quantification method of principal component analysis or the like. A distance measure such as Euclidean distance or the like is defined. Then clustering is performed. Typical clustering methods include a K-means method, a hierarchical clustering method (a group average method, a furthest neighbor method, and a Ward method), a soft clustering method and the like.

At this time, it is desirable to perform clustering reflecting preference distance (for example constrained clustering). For this, a partial collection of correct answers (a set of near actual information and a set of distant actual information in terms of preference or the like) is made by a preliminary study, and numerical value expression, distance, and a clustering method adapted thereto are used. Further, it is desirable to select clustering methods that increase independence of each cluster layer formed (that is, clustering methods with different characteristics).

Incidentally, one piece of actual information may be classified into a plurality of clusters in a same cluster layer. Suppose that a distance (indicating a degree of similarity) between the clusters present in the same cluster layer is known. This clustering method will be described later. Then, as information indicating a characteristic of a musical piece in place of metadata, cluster information composed of a cluster ID (CL11 or the like in FIG. 2) of a cluster into which actual information of each item of the metadata is classified is generated, and output to the clustered DB 14.

Incidentally, when there is no cluster suitable for classification, a new cluster may be provided. Each cluster has an arbitrary size, and can include a plurality of pieces of actual information. Incidentally, a cluster into which only a single piece of actual information can be classified may be provided.

In this case, an ID (an artist ID, an album ID, or a title ID) of the single classifiable piece of actual information may be used as a cluster ID of the cluster.

The clustered DB 14 generates the cluster-musical piece correspondence table 15 and the musical piece-cluster correspondence table 16 on the basis of the cluster information of each musical piece which information is generated by the clustering unit 12, and retains the cluster-musical piece correspondence table 15 and the musical piece-cluster correspondence table 16. The clustered DB 14 also retains a keyword set to each cluster layer and each cluster which keyword is set by the keyword setting unit 13.

FIG. 3 shows an example of the musical piece-cluster correspondence table 16. FIG. 3 shows that the cluster information of a musical piece having a musical piece ID=ABC123, for example, is (CL12, CL21, CL35, CL47, CL52, . . . , and CLn2). FIG. 3 also shows that the cluster information of a musical piece having a musical piece ID=CTH863, for example, is cluster IDs (CL11, CL25, CL31, CL42, CL53, . . . , and CLn1).

FIG. 4 shows an example of the cluster-musical piece correspondence table 15 corresponding to the musical piece-cluster correspondence table 16 shown in FIG. 3. FIG. 4 shows that the musical piece ID=CTH863 corresponds to the cluster ID=CL11, for example. FIG. 4 also shows that the musical piece ID=ABC123 corresponds to the cluster ID=CL21, for example. FIG. 4 further shows that a musical piece ID=XYZ567 corresponds to a cluster ID=CL32, for example.

Incidentally, the processes of the clustering unit 12, the keyword setting unit 13, and the clustered DB 14 need to be performed every time the metadata of a new musical piece is added to the musical piece DB 11.

Returning to FIG. 1, the user history information DB 17 retains history information indicating musical pieces that each user purchased, listened to on a trial basis, or retrieved on the selling site, or musical pieces declared to be purchased in some selling site and already possessed. The user history information DB 17 also retains a preference vector of each user, the preference vector being generated by the preference vector generating unit 19. Further, the user history information DB 17 retains a result of grouping of users by the user grouping unit 20, that is, information indicating to which user group each user belongs.

The preference vector generating unit 19 generates, for each user, a multidimensional preference vector with each of all clusters as one dimension on the basis of the history information of each user which information is retained in the user history information DB 17. The preference vector generating unit 19 outputs the preference vector to the user history information DB 17. Specifically, the musical piece-cluster correspondence table 16 in the clustered DB 14 is referred to for each musical piece included in the history information of a user, and a predetermined value is added to a dimension of the preference vector which dimension corresponds to a cluster to which the musical piece belongs. The generated preference vector of each user is managed in the user history information DB 17. When the history information of the user is updated by purchasing a musical piece or the like, the preference vector is also updated.

Suppose for the convenience of description that as shown in FIGS. 5A and 5B, as all clusters, there are only three clusters CL11, CL12, and CL13 in a first layer, four clusters CL21, CL22, CL23, and CL24 in a second layer, three clusters CL31, CL32, and CL33 in a third layer, and three clusters CL41, CL42, and CL43 in a fourth layer. In this case, a preference vector has 13 dimensions.

For example, when purchase of two musical pieces is recorded in the history information of a user A, and cluster IDs to which the first musical piece belongs are CL11, CL22, CL33, and CL41, one is added to each of the values of dimensions corresponding to these cluster IDs. When cluster IDs to which the second musical piece belongs are CL12, CL24, CL32, and CL43, one is added to each of the values of dimensions corresponding to these cluster IDs. Then, the preference vector of the user A (1, 1, 0, 0, 1, 0, 1, 0, 1, 1, 1, 0, 1) is generated.

For example, when purchase of three musical pieces is recorded in the history information of a user X, and cluster IDs to which the first musical piece belongs are CL11, CL22, CL32, and CL43, one is added to each of the values of dimensions corresponding to these cluster IDs. When cluster IDs to which the second musical piece belongs are CL12, CL22, CL33, and CL42, one is added to each of the values of dimensions corresponding to these cluster IDs. When cluster IDs to which the third musical piece belongs are CL13, CL24, CL33, and CL41, one is added to each of the values of dimensions corresponding to these cluster IDs. Then, the preference vector of the user X (1, 1, 1, 0, 2, 0, 1, 0, 1, 2, 1, 1, 1) is generated.

Incidentally, a value added to each dimension may be changed according to a type of history information (that is, purchase, trial listening, retrieval, or possession). For example, one may be added for purchase or possession, 0.5 may be added for trial listening, and 0.3 may be added for retrieval.

Returning to FIG. 1, the user grouping unit 20 groups all users on the basis of similarity between preference vectors of the users, the preference vectors being retained in the user history information DB 17. In order to facilitate a process of determining similarity between multidimensional preference vectors, however, the value of each dimension of the preference vector of each user is binarized. That is, when the value of each dimension is one or more, the value is replaced with one, while when the value of each dimension is zero, the value remains zero. When the value of each dimension of the preference vectors is thus binarized, an amount of calculation required for similarity determination can be reduced as compared with a case where the binarization is not performed. Therefore grouping can be performed easily. A result of the grouping is managed in the user history information DB 17.

The similar user detecting unit 21 detects another user having similar history information to that of a user to whom to recommend a musical piece by comparing the history information of each user, the history information being retained in the user history information DB 17. In addition, the similar user detecting unit 21 detects another user having a similar preference vector to that of a user to whom to recommend a musical piece by comparing the history information of each user, the history information being retained in the user history information DB 17. The difference detecting unit 22 detects a difference in history information between the user to whom to recommend the musical piece and the other user detected by the similar user detecting unit 21 on the basis of the history information of each user, the history information being retained in the user history information DB 17. The recommended cluster determining unit 23 determines a recommended cluster on the basis of a difference between the preference vectors of the user to whom to recommend the musical piece and the other user detected by the similar user detecting unit 21. The extracting unit 24 extracts musical pieces as recommendation candidates on the basis of results of the processes of the similar user detecting unit 21 to the recommended cluster determining unit 23 and the clustered DB 14.

The musical piece selecting unit 25 selects one musical piece from among the plurality of extracted musical pieces according to a predetermined condition. For example, the musical piece selecting unit 25 selects one musical piece belonging to a larger number of recommended clusters, selects one musical piece belonging to a recommended cluster in a cluster layer having a high priority set in advance, or randomly selects one musical piece. The musical piece selecting unit 25 outputs a result of the selection to the novelty determining unit 26 and the selection reason generating unit 27. On the basis of the preference vector of the user to whom to recommend the musical piece, the novelty determining unit 26 determines that there is no novelty when a degree of overlap between the preference vector and clusters to which the selected musical piece belongs is a predetermined rate (for example 30%) or higher. When the degree of overlap is lower than the predetermined rate, the novelty determining unit 26 determines that there is novelty. The novelty determining unit 26 outputs a result of the determination to the selection reason generating unit 27.

The selection reason generating unit 27 obtains a keyword corresponding to a cluster layer or a cluster to which the selected musical piece belongs from the clustered DB 14, and generates selection reason text indicating a reason for the selection using the obtained keyword and the like. In addition, the selection reason generating unit 27 generates the selection reason text also on the basis of the determination result from the novelty determining unit 26 by for example including a word such as "unexpected" for a novel musical piece or a word such as "usual" or "familiar" for a musical piece that is not novel. Then, the selection reason generating unit 27 outputs the generated selection reason text to the presenting unit 28 together with the musical piece ID of the selected musical piece.

Incidentally, review text of the selected musical piece may be quoted as it is as the selection reason text, or the selection reason text may be generated using words extracted from the review text of the selected musical piece. Incidentally, a Tf/idf method can be applied to the extraction of words used in the selection reason text from the review text.

The presenting unit 28 obtains information on the selected musical piece from the musical piece DB, and presents the information to the user side together with the generated selection reason text.

The operation of the recommendation system 1 will next be described. First, preprocessing at an offline time as preparation for a process of recommending a musical piece will be described with reference to a flowchart of FIG. 6.

In step S1, the clustering unit 12 classifies all musical pieces in the musical piece DB 11 into one of cluster layers (first to nth layers) for each item of the metadata of the musical pieces, and classifies the actual information of each item into one of a plurality of clusters provided in the classified cluster layer (clustering). Then, as information indicating a characteristic of a musical piece in place of metadata, the clustering unit 12 generates cluster information composed of a cluster ID of the cluster into which the actual information of each item of the metadata is classified. The clustering unit 12 outputs the cluster information to the clustered DB 14. Incidentally, clustering of already clustered musical pieces may be omitted, and clustering of only unclustered musical pieces may be performed. The clustered DB 14 generates a cluster-musical piece correspondence table 15 and a musical piece-cluster correspondence table 16 on the basis of the cluster information of each musical piece which cluster information is generated by the clustering unit 12.

In step S2, the preference vector generating unit 19 in the recommendation candidate selecting unit 18 generates a preference vector for each user on the basis of the history information of each user which history information is retained in the user history information DB 17. The preference vector generating unit 19 outputs the preference vector to the user history information DB 17. In step S3, the user grouping unit 20 groups all users on the basis of similarity of the preference vector of each user which preference vector is retained in the user history information DB 17. In order to facilitate a process of determining similarity between multidimensional preference vectors, however, the value of each dimension of the preference vector of each user is binarized. Then, a result of the grouping is output to the user history information DB 17. After the foregoing, the preprocessing at the offline time is ended.

By thus clustering all the musical pieces retained in the musical piece DB 11, generating the preference vector of each user, and grouping the users as preprocessing, it is possible to perform a first to a seventh recommendation process to be described later promptly. Incidentally, some of the first to seventh recommendation processes do not use user group information. Therefore, when only the recommendation processes that do not use user group information are performed, the process of step S3 may be omitted.

Figure 7:
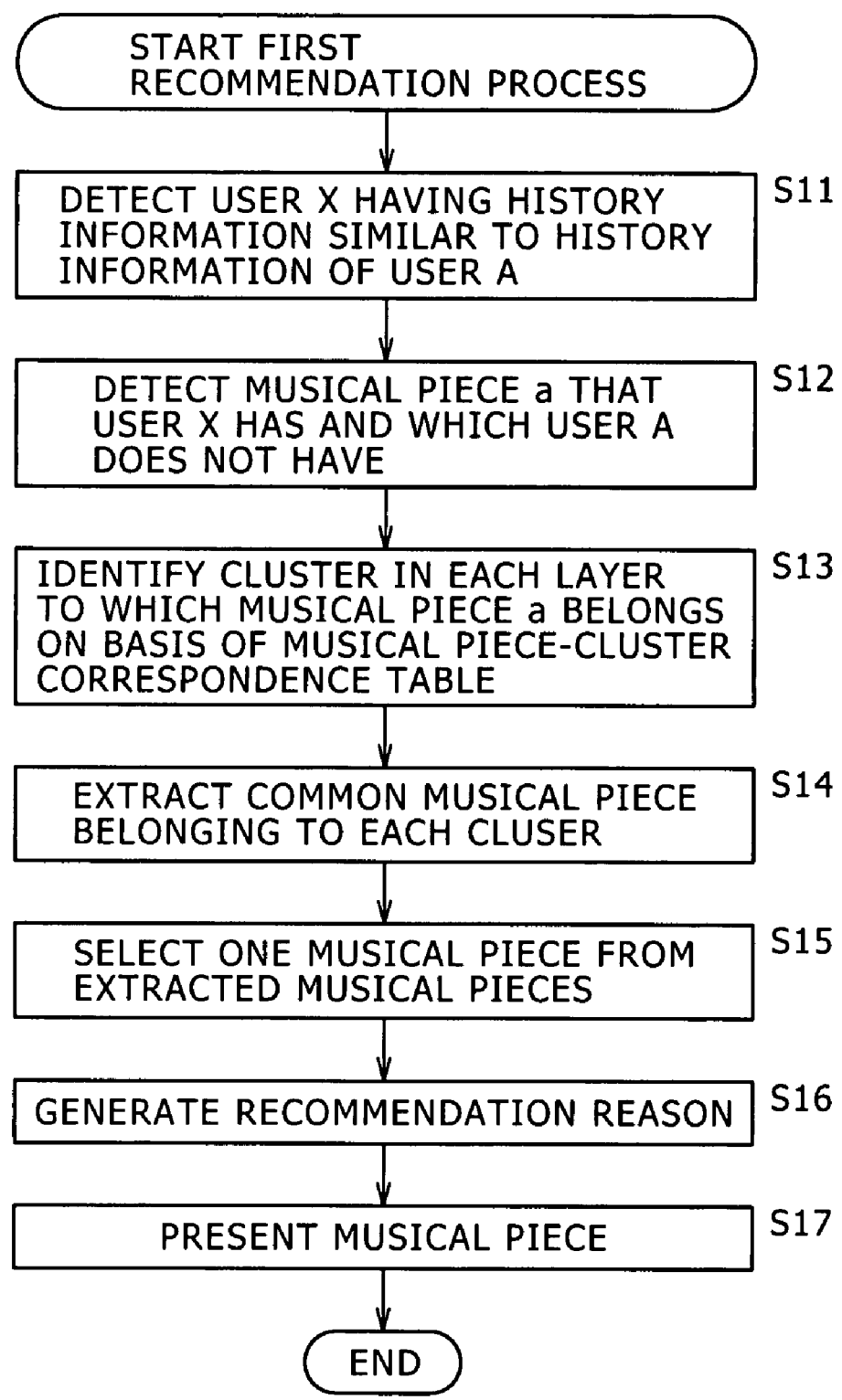
FIG. 7 is a flowchart of assistance in explaining a first recommendation process.

The first recommendation process will next be described with reference to a flowchart of FIG. 7. In the following, a user to whom to recommend a musical piece will be described as a user A. This process is started when the user A accesses the selling site, for example.

In step S11, the similar user detecting unit 21 compares the history information of the user A which history information is retained in the user history information DB 17 with the history information of other users, and thereby detects another user X having most similar history information to that of the user A. In step S12, the difference detecting unit 22 detects a musical piece that the user X has (has purchased in the past or possesses) and which the user A does not have on the basis of the history information of the user A and the user X which history information is retained in the user history information DB 17. Incidentally, when there are a plurality of musical pieces that satisfy this condition, one of the musical pieces is selected randomly, for example. The detected musical piece is set as a musical piece a.

In step S13, the recommended cluster determining unit 23 refers to the musical piece-cluster correspondence table 16 in the clustered DB 14 to identify a cluster in each cluster layer to which the musical piece a belongs. In step S14, the extracting unit 24 refers to the cluster-musical piece correspondence table 15 in the clustered DB 14 to extract a common musical piece classified into all the clusters identified in the process of step S13. The musical piece extracted in this step is set as a recommendation candidate. There may be a plurality of recommendation candidates. Incidentally, when there is no common musical piece classified into all the clusters identified in the process of step S13, a common musical piece classified into as many clusters as possible of the clusters identified in the process of step S13 is extracted and set as a recommendation candidate.

In step S15, the musical piece selecting unit 25 selects one of the musical pieces as recommendation candidates which musical piece has most similar cluster information to that of the musical piece a detected in step S12. The musical piece selecting unit 25 outputs a result of the selection to the novelty determining unit 26 and the selection reason generating unit 27. In step S16, the novelty determining unit 26 determines whether there is novelty or not on the basis of the preference vector of the user A and the clusters to which the selected musical piece belongs. The novelty determining unit 26 outputs a result of the determination to the selection reason generating unit 27. The selection reason generating unit 27 obtains a keyword corresponding to a cluster layer or a cluster to which the selected musical piece belongs from the clustered DB 14, and generates selection reason text indicating a reason for the selection using the obtained keyword and the like. In addition, the selection reason generating unit 27 generates the selection reason text also on the basis of the determination result from the novelty determining unit 26. Then, the selection reason generating unit 27 outputs the generated selection reason text to the presenting unit 28 together with the musical piece ID of the selected musical piece. In step S17, the presenting unit 28 obtains information on the selected musical piece from the musical piece DB, and presents the information to the user side together with the generated selection reason text. After the foregoing, the first recommendation process is ended.

Figure 8:
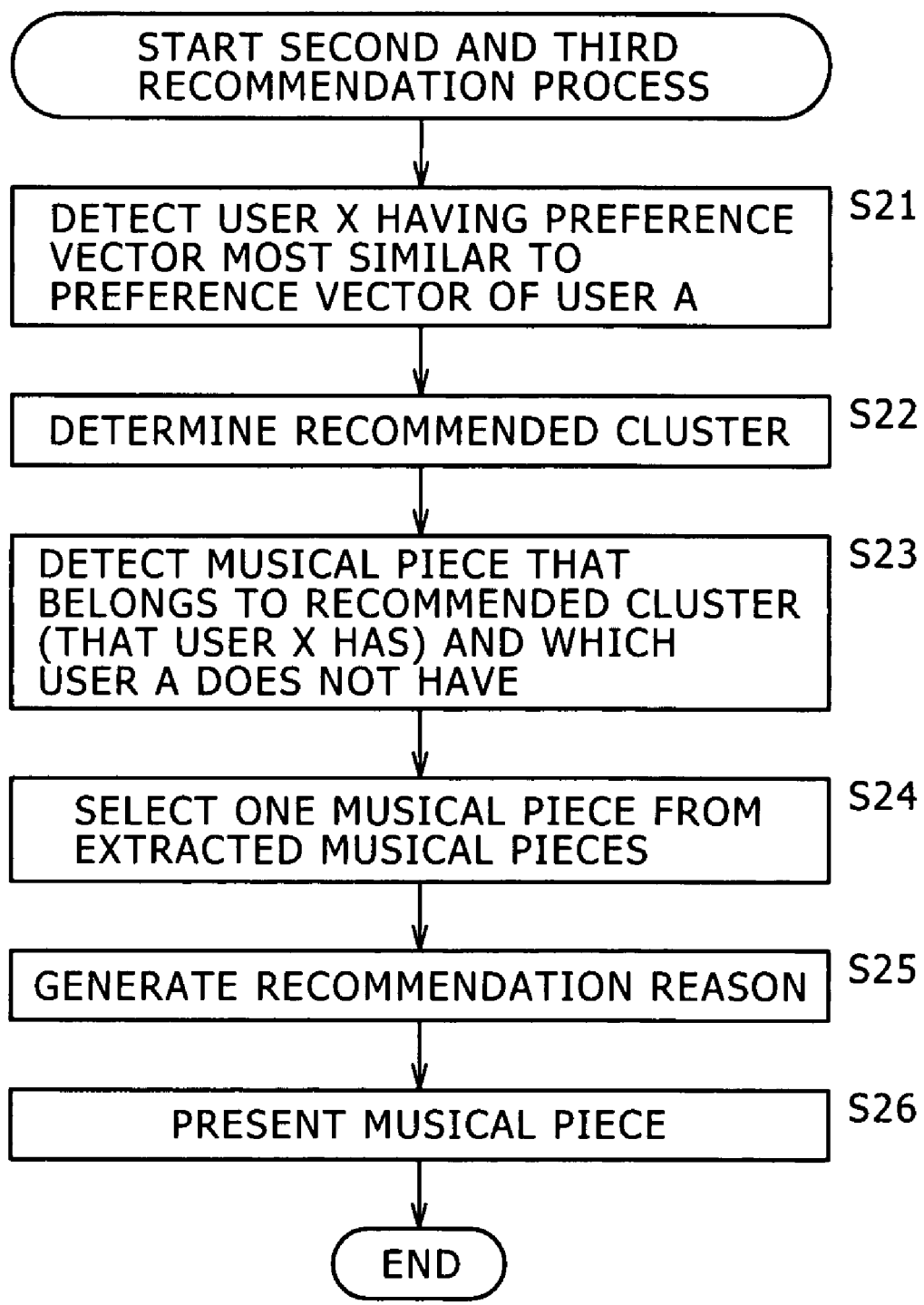
FIG. 8 is a flowchart of assistance in explaining a second and a third recommendation process.

The second and third recommendation processes will next be described with reference to a flowchart of FIG. 8. The second recommendation process will first be described. This process is started when the user A accesses the selling site, for example.

In step S21, the similar user detecting unit 21 compares the preference vector of the user A which preference vector is retained in the user history information DB 17 with the preference vector of other users, and thereby detects another user X having a most similar preference vector to that of the user A. Incidentally, similarity between the preference vector of the user A and the preference vector of another user is determined by calculating a cosine correlation value between the two preference vectors, for example.

In step S22, the difference detecting unit 22 detects a preference vector dimension that is a value of zero in the preference vector of the user A and is a value other than zero in the preference vector of the user X, and sets a cluster corresponding to the detected dimension as a recommended cluster.

For example, when the preference vector of the user A is (1, 1, 0, 0, 1, 0, 1, 0, 1, 1, 1, 0, 1) as shown in FIG. 5A, and the preference vector of the user X is (1, 1, 1, 0, 2, 0, 1, 0, 1, 2, 1, 1, 1) as shown in FIG. 5B, the clusters CL13 and CL42 are set as recommended clusters as shown by hatch lines in FIG. 5B.

In step S23, referring to the user history information DB 17 and the cluster-musical piece correspondence table 15 in the clustered DB 14, the extracting unit 24 extracts musical pieces that the user X has and which the user A does not have among all the musical pieces classified into the recommended clusters. The extracting unit 24 sets the extracted musical pieces as recommendation candidates.

In step S24, the musical piece selecting unit 25 selects one musical piece among the musical pieces as recommendation candidates by one of the following three methods or a method as a combination of the three methods, and then outputs a result of the selection to the novelty determining unit 26 and the selection reason generating unit 27. The first method is to select a common musical piece belonging to a larger number of recommended clusters. The second method is to prioritize cluster layers in advance and select a musical piece classified into a recommended cluster belonging to a cluster layer having a higher priority. The third method is random selection.

In step S25, the novelty determining unit 26 determines whether there is novelty or not on the basis of the preference vector of the user A and clusters to which the selected musical piece belongs. The novelty determining unit 26 outputs a result of the determination to the selection reason generating unit 27. The selection reason generating unit 27 obtains a keyword corresponding to a cluster layer or a cluster to which the selected musical piece belongs from the clustered DB 14, and generates selection reason text indicating a reason for the selection using the obtained keyword and the like. In addition, the selection reason generating unit 27 generates the selection reason text also on the basis of the determination result from the novelty determining unit 26. Then, the selection reason generating unit 27 outputs the generated selection reason text to the presenting unit 28 together with the musical piece ID of the selected musical piece. In step S26, the presenting unit 28 obtains information on the selected musical piece from the musical piece DB, and presents the information to the user side together with the generated selection reason text. After the foregoing, the second recommendation process is ended.

The third recommendation process will next be described. The third recommendation process extracts musical pieces that the user A does not have among all the musical pieces classified into the recommended clusters in the process of step S23 in the above-described second recommendation process, and sets the extracted musical pieces as recommendation candidates. That is, musical pieces that the user X does not have can be set as recommendation candidates. The other processes are the same as in the second recommendation process, and therefore description thereof will be omitted.

Figure 9:
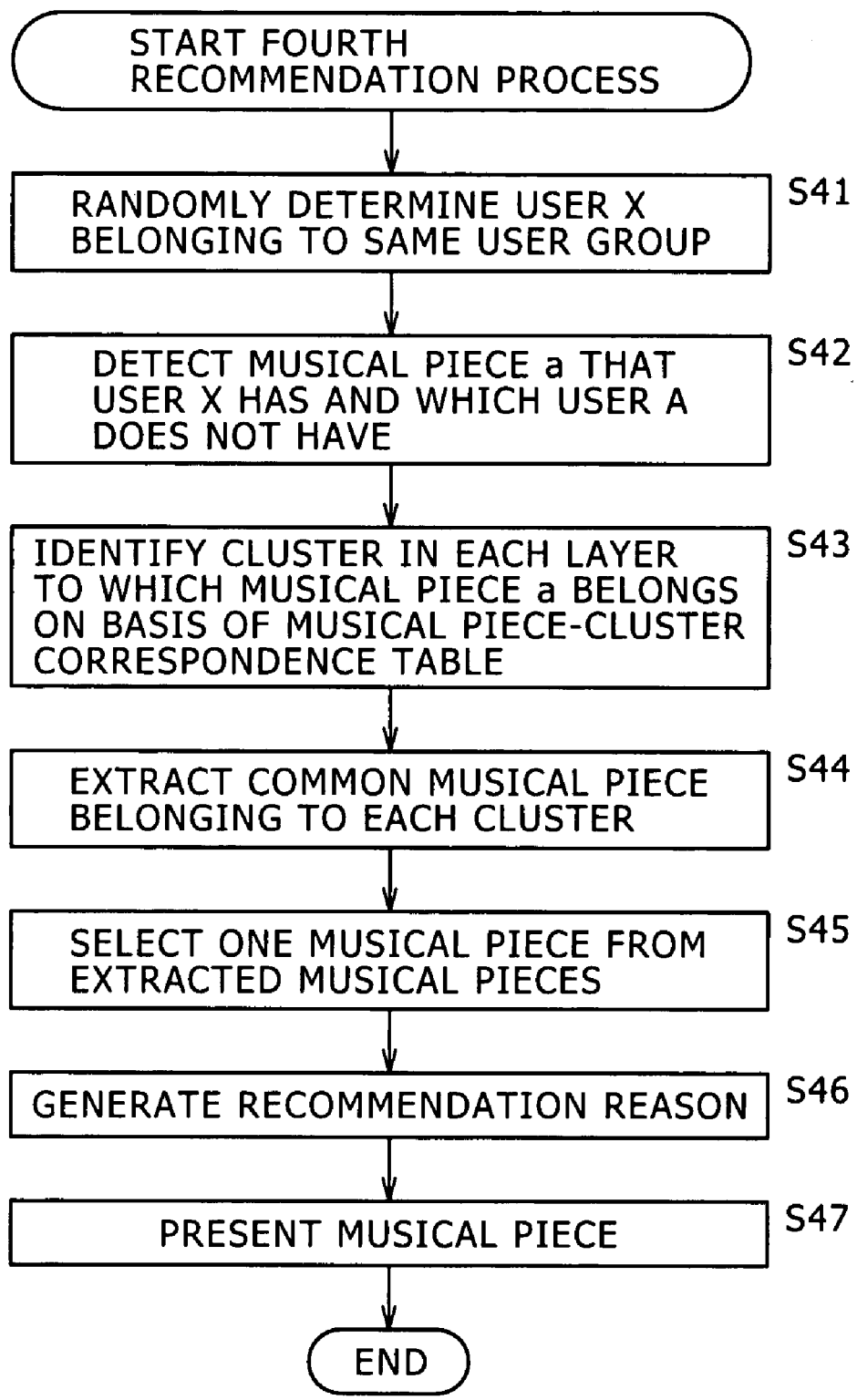
FIG. 9 is a flowchart of assistance in explaining a fourth recommendation process.

The fourth recommendation process will next be described with reference to a flowchart of FIG. 9. This process is started when the user A accesses the selling site, for example.

In step S41, on the basis of group information of the user A which information is retained in the user history information DB 17, the similar user detecting unit 21 randomly determines another user X belonging to the same group as the user A. In step S42, the difference detecting unit 22 detects a musical piece that the user X has and which the user A does not have on the basis of the history information of the user A and the user X which history information is retained in the user history information DB 17. Incidentally, when there are a plurality of musical pieces that satisfy this condition, one of the musical pieces is selected randomly, for example. The detected musical piece is set as a musical piece a.

In step S43, the recommended cluster determining unit 23 refers to the musical piece-cluster correspondence table 16 in the clustered DB 14 to identify a cluster in each cluster layer to which the musical piece a belongs. In step S44, the extracting unit 24 refers to the cluster-musical piece correspondence table 15 in the clustered DB 14 to extract a common musical piece classified into all the clusters identified in the process of step S43. The musical piece extracted in this step is set as a recommendation candidate. There may be a plurality of recommendation candidates. Incidentally, when there is no common musical piece classified into all the clusters identified in the process of step S43, a common musical piece classified into as many clusters as possible of the clusters identified in the process of step S43 is extracted and set as a recommendation candidate.

In step S45, the musical piece selecting unit 25 selects one of the musical pieces as recommendation candidates which musical piece has most similar cluster information to that of the musical piece a detected in step S42. The musical piece selecting unit 25 outputs a result of the selection to the novelty determining unit 26 and the selection reason generating unit 27. In step S46, the novelty determining unit 26 determines whether there is novelty or not on the basis of the preference vector of the user A and the clusters to which the selected musical piece belongs. The novelty determining unit 26 outputs a result of the determination to the selection reason generating unit 27. The selection reason generating unit 27 obtains a keyword corresponding to a cluster layer or a cluster to which the selected musical piece belongs from the clustered DB 14, and generates selection reason text indicating a reason for the selection using the obtained keyword and the like. In addition, the selection reason generating unit 27 generates the selection reason text also on the basis of the determination result from the novelty determining unit 26. Then, the selection reason generating unit 27 outputs the generated selection reason text to the presenting unit 28 together with the musical piece ID of the selected musical piece. In step S47, the presenting unit 28 obtains information on the selected musical piece from the musical piece DB, and presents the information to the user side together with the generated selection reason text. After the foregoing, the fourth recommendation process is ended.

In the fourth recommendation process, the group information of the users grouped by the preprocessing at the offline time is used, and therefore the user X having a similar history to that of the user A can be determined quickly.

Figure 10:
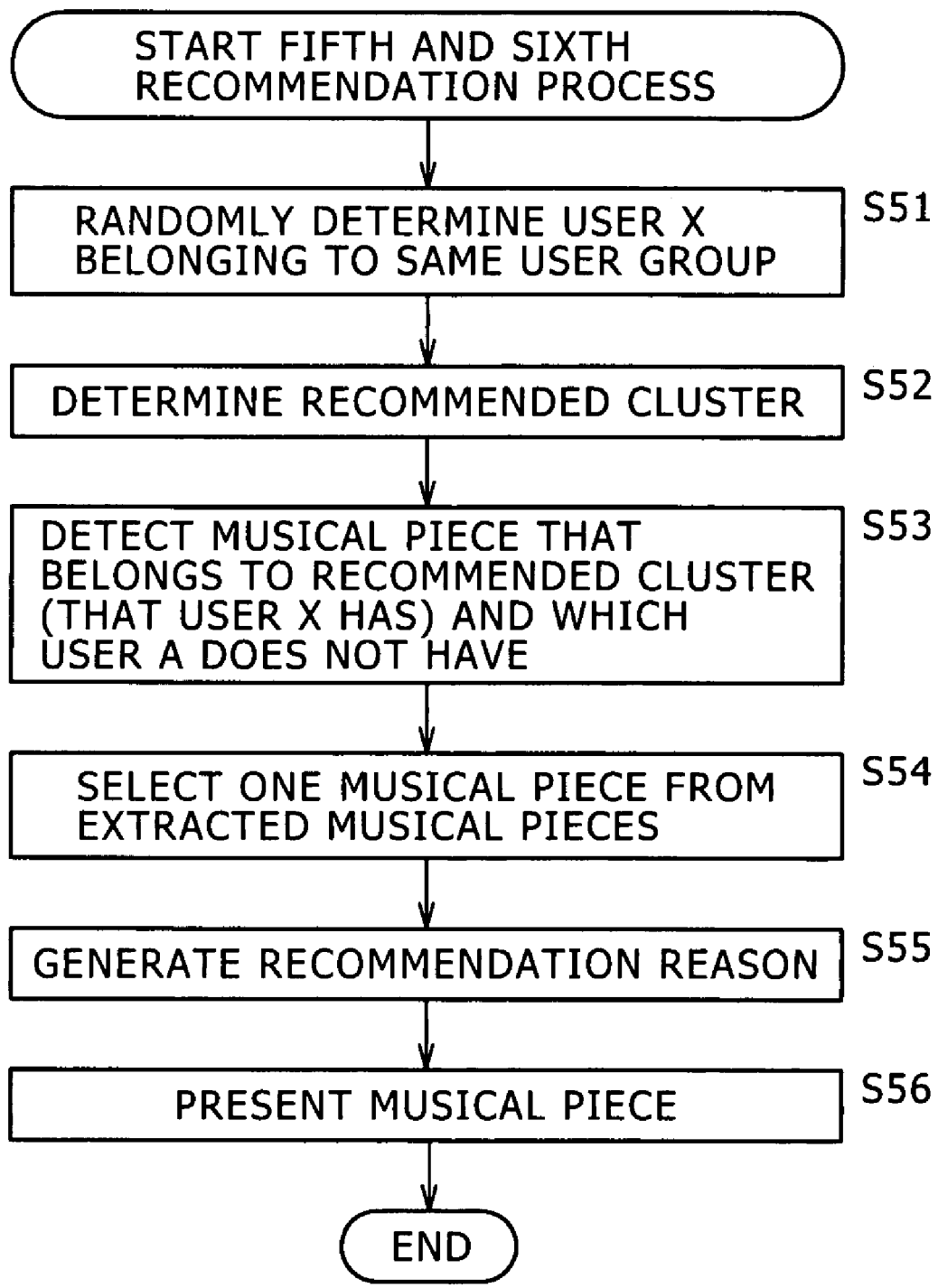
FIG. 10 is a flowchart of assistance in explaining a fifth and a sixth recommendation process.

The fifth and sixth recommendation processes will next be described with reference to a flowchart of FIG. 10. The fifth recommendation process will first be described. This process is started when the user A accesses the selling site, for example.

In step S51, on the basis of group information of the user A which information is retained in the user history information DB 17, the similar user detecting unit 21 randomly determines another user X belonging to the same group as the user A.

In step S52, the difference detecting unit 22 detects a preference vector dimension that is a value of zero in the preference vector of the user A and is a value other than zero in the preference vector of the user X, and sets a cluster corresponding to the detected dimension as a recommended cluster.

In step S53, referring to the user history information DB 17 and the cluster-musical piece correspondence table 15 in the clustered DB 14, the extracting unit 24 extracts musical pieces that the user X has and which the user A does not have among all the musical pieces classified into the recommended clusters. The extracting unit 24 sets the extracted musical pieces as recommendation candidates.

In step S54, the musical piece selecting unit 25 selects one musical piece among the musical pieces as recommendation candidates by one of the following three methods or a method as a combination of the three methods, and then outputs a result of the selection to the novelty determining unit 26 and the selection reason generating unit 27. The first method is to select a common musical piece belonging to a larger number of recommended clusters. The second method is to prioritize cluster layers in advance and select a musical piece classified into a recommended cluster belonging to a cluster layer having a higher priority. The third method is random selection.

In step S55, the novelty determining unit 26 determines whether there is novelty or not on the basis of the preference vector of the user A and clusters to which the selected musical piece belongs. The novelty determining unit 26 outputs a result of the determination to the selection reason generating unit 27. The selection reason generating unit 27 obtains a keyword corresponding to a cluster layer or a cluster to which the selected musical piece belongs from the clustered DB 14, and generates selection reason text indicating a reason for the selection using the obtained keyword and the like. In addition, the selection reason generating unit 27 generates the selection reason text also on the basis of the determination result from the novelty determining unit 26. Then, the selection reason generating unit 27 outputs the generated selection reason text to the presenting unit 28 together with the musical piece ID of the selected musical piece. In step S56, the presenting unit 28 obtains information on the selected musical piece from the musical piece DB, and presents the information to the user side together with the generated selection reason text. After the foregoing, the fifth recommendation process is ended.

The sixth recommendation process will next be described. The sixth recommendation process extracts musical pieces that the user A does not have among all the musical pieces classified into the recommended clusters in the process of step S53 in the above-described fifth recommendation process, and sets the extracted musical pieces as recommendation candidates. That is, musical pieces that the user X does not have can be set as recommendation candidates. The other processes are the same as in the fifth recommendation process, and therefore description thereof will be omitted.

In the fifth and sixth recommendation processes, the group information of the users grouped by the preprocessing at the offline time is used, and therefore the user X having a similar history to that of the user A can be determined quickly.

Figure 11:
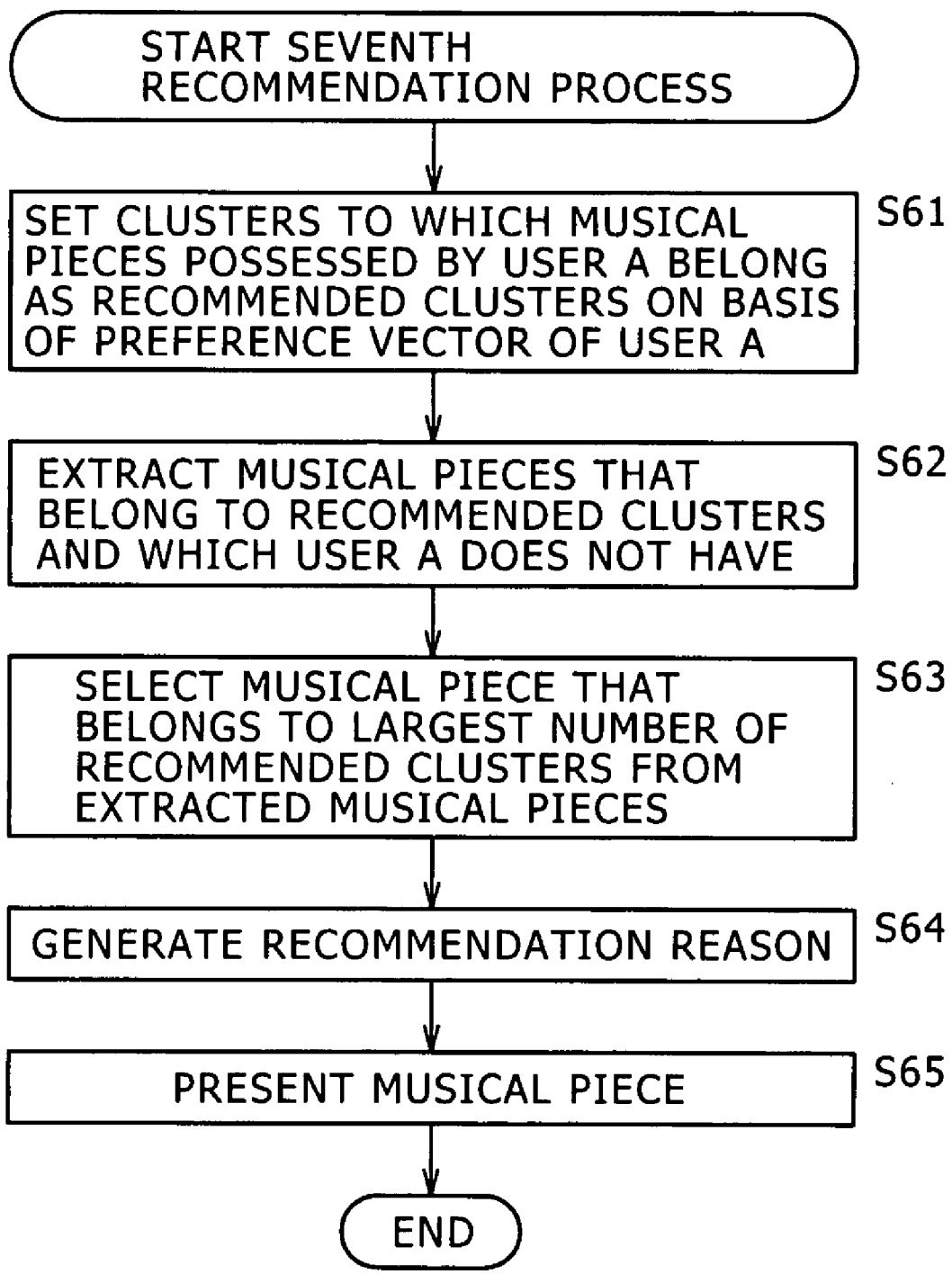
FIG. 11 is a flowchart of assistance in explaining a seventh recommendation process.

The seventh recommendation process will next be described with reference to a flowchart of FIG. 11. The seventh recommendation process will first be described. This process is suitable in a case where there is very little history information of the user A, a case where there are a small number of other users, and the like, and is started when the user A accesses the selling site, for example.

In step S61, the difference detecting unit 22 detects dimensions whose value is a predetermined value or more among the dimensions of the preference vector of the user A, and sets clusters corresponding to the dimensions as recommended clusters.

In step S62, referring to the user history information DB 17 and the cluster-musical piece correspondence table 15 in the clustered DB 14, the extracting unit 24 extracts musical pieces that the user A does not have among all the musical pieces classified into the recommended clusters. The extracting unit 24 sets the extracted musical pieces as recommendation candidates.

In step S63, the musical piece selecting unit 25 selects one musical piece belonging to a largest number of recommended clusters among the musical pieces as recommendation candidates, and then outputs a result of the selection to the novelty determining unit 26 and the selection reason generating unit 27. Incidentally, when there are a plurality of musical pieces that belong to the largest number of recommended clusters, one musical piece is randomly selected from among the musical pieces, for example.

In step S64, the novelty determining unit 26 determines whether there is novelty or not on the basis of the preference vector of the user A and clusters to which the selected musical piece belongs. The novelty determining unit 26 outputs a result of the determination to the selection reason generating unit 27. The selection reason generating unit 27 obtains a keyword corresponding to a cluster layer or a cluster to which the selected musical piece belongs from the clustered DB 14, and generates selection reason text indicating a reason for the selection using the obtained keyword and the like. In addition, the selection reason generating unit 27 generates the selection reason text also on the basis of the determination result from the novelty determining unit 26. Then, the selection reason generating unit 27 outputs the generated selection reason text to the presenting unit 28 together with the musical piece ID of the selected musical piece. In step S65, the presenting unit 28 obtains information on the selected musical piece from the musical piece DB, and presents the information to the user side together with the generated selection reason text. After the foregoing, the seventh recommendation process is ended.

According to the above-described first to seventh recommendation processes, the history information of a user is replaced with a preference vector with each cluster as one dimension, and the CF method is applied. It is therefore possible to prevent musical piece recommendation to the user A from concentrating on a part of all the musical pieces present in the musical piece DB 11. It is also possible to recommend a musical piece to a user with little history information, and thus avoid a so-called cold start problem. Further, a reason for selection of a recommended musical piece can be presented to the user A, and, for example, the user A can be informed whether the recommended musical piece is new to the user A.

It is to be noted that the present invention is applicable not only to a case of recommending a musical piece but also to selling sites selling contents other than musical pieces, for example television programs, movies, books and the like.

Figure 12:
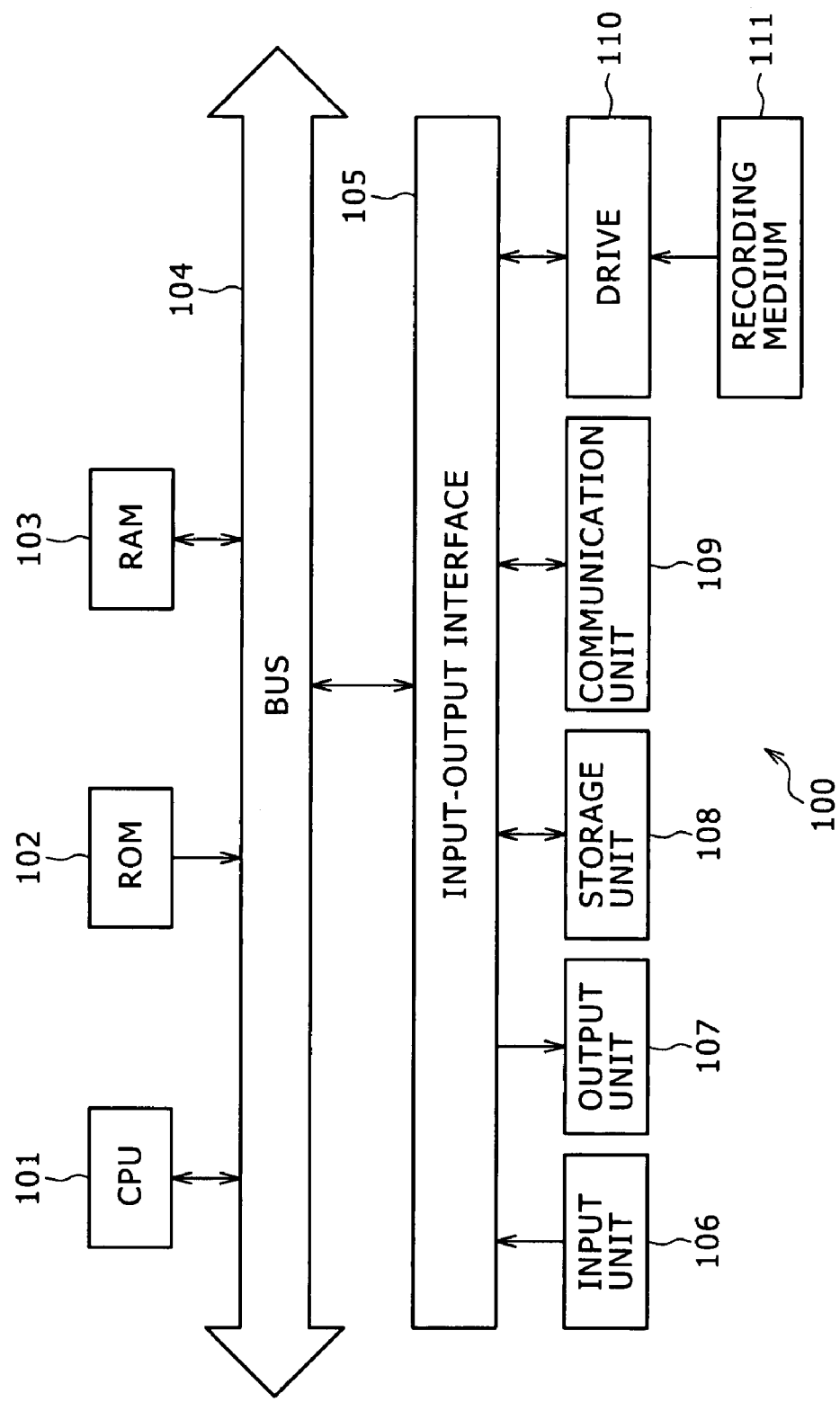
FIG. 12 is a block diagram showing an example of configuration of a general-purpose personal computer.

The series of processes described above can be carried out not only by hardware but also by software. When the series of processes is to be carried out by software, a program constituting the software is installed from a recording medium onto a computer incorporated in special hardware, or a general-purpose personal computer configured as shown in FIG. 12, for example, that can perform various functions by installing various programs thereon.

The personal computer 100 includes a CPU (Central Processing Unit) 101. The CPU 101 is connected with an input-output interface 105 via a bus 104. The bus 104 is connected with a ROM (Read Only Memory) 102 and a RAM (Random Access Memory) 103.

The input-output interface 105 is connected with an input unit 106 including input devices such as a keyboard, a mouse and the like to which a user inputs an operating command, an output unit 107 including a display such as a CRT (Cathode Ray Tube), an LCD (Liquid Crystal Display) or the like for screen display, a storage unit 108 including a hard disk drive and the like for storing programs and various data, and a communication unit 109 including a modem, a LAN (Local Area Network) adapter, and the like, the communication unit 109 performing communication processing via a network typified by the Internet. The input-output interface 105 is also connected with a drive 110 for reading and writing data from and to a recording medium 111 such as a magnetic disk (including flexible disks), an optical disk (including CD-ROM (Compact Disc-Read Only Memory) and DVD (Digital Versatile Disc)), a magneto-optical disk (including MD (Mini Disc)), a semiconductor memory or the like.

The program for making the personal computer 100 perform the above-described series of processes is supplied to the personal computer 100 in a state of being stored on the recording medium 111, read by the drive 110, and installed on the hard disk drive included in the storage unit 108. According to an instruction of the CPU 101 which instruction corresponds to a command from the user which command is input to the input unit 106, the program installed in the storage unit 108 is loaded from the storage unit 108 into the RAM 103 and executed.

Figure 13:
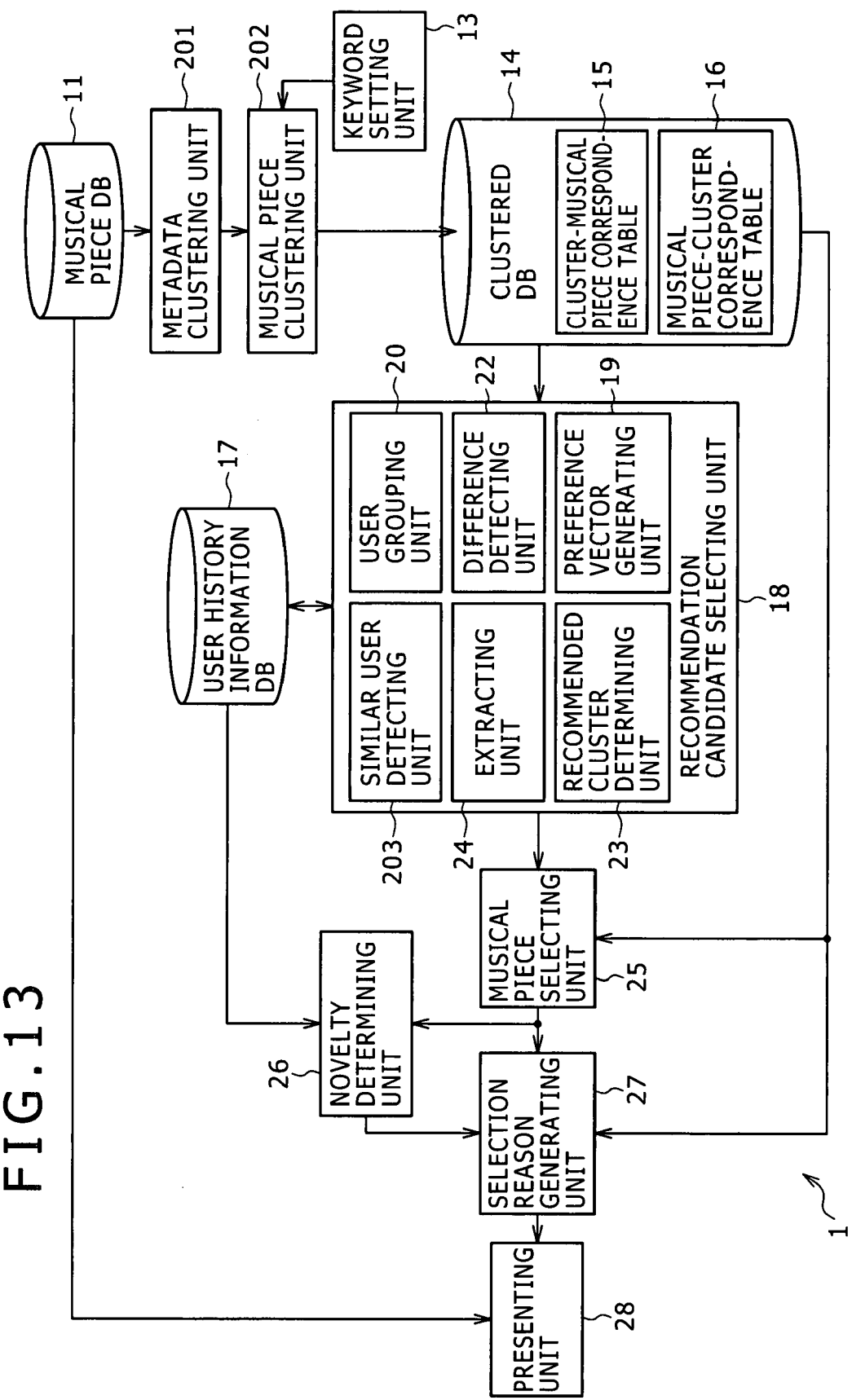
FIG. 13 is a block diagram showing another example of configuration of a recommendation system according to an embodiment of the present invention.

FIG. 13 is a block diagram showing another example of configuration of a recommendation system 1 according to an embodiment of the present invention. In FIG. 13, same parts as shown in FIG. 1 are identified by the same reference numerals, and description thereof will be omitted.

The recommendation system 1 shown in FIG. 13 includes a musical piece DB 11, a keyword setting unit 13, a clustered DB 14, a user history information DB 17, a recommendation candidate selecting unit 18, a musical piece selecting unit 25, a novelty determining unit 26, a selection reason generating unit 27, a presenting unit 28, a metadata clustering unit 201, and a musical piece clustering unit 202.

The metadata clustering unit 201 clusters the metadata of each cluster recorded in the musical piece DB 11. That is, the metadata clustering unit 201 classifies the metadata of a musical piece as a content into one of a plurality of clusters, and assigns a layer to the clusters.

The metadata clustering unit 201 supplies a result of the clustering of the metadata of each musical piece to the musical piece clustering unit 202.

On the basis of the result of the clustering of the metadata of each musical piece by the metadata clustering unit 201, as with the clustering unit 12, the musical piece clustering unit 202 clusters each musical piece and generates cluster information of each musical piece. That is, the musical piece clustering unit 202 generates cluster information according to a result of the clustering of each musical piece. The musical piece clustering unit 202 outputs the cluster information to the clustered DB 14.

The recommendation candidate selecting unit 18 in the recommendation system 1 shown in FIG. 13 includes a preference vector generating unit 19, a user grouping unit 20, a difference detecting unit 22, a recommended cluster determining unit 23, an extracting unit 24, and a similar user detecting unit 203.

The similar user detecting unit 203 detects another user having a similar preference vector to that of a user to whom to recommend a musical piece by comparing the preference vector of each user, which preference vector is retained in the user history information DB 17. More specifically, the similar user detecting unit 203 normalizes preference vectors as an example of user preference information, calculates the weight of each layer for each user from the normalized preference vector of each user, calculates a degree of similarity indicating a degree of similarity of preferences between users from the weight of each layer and the preference vector, and detects a second user having similar preferences to those of a first user.

Figure 14:
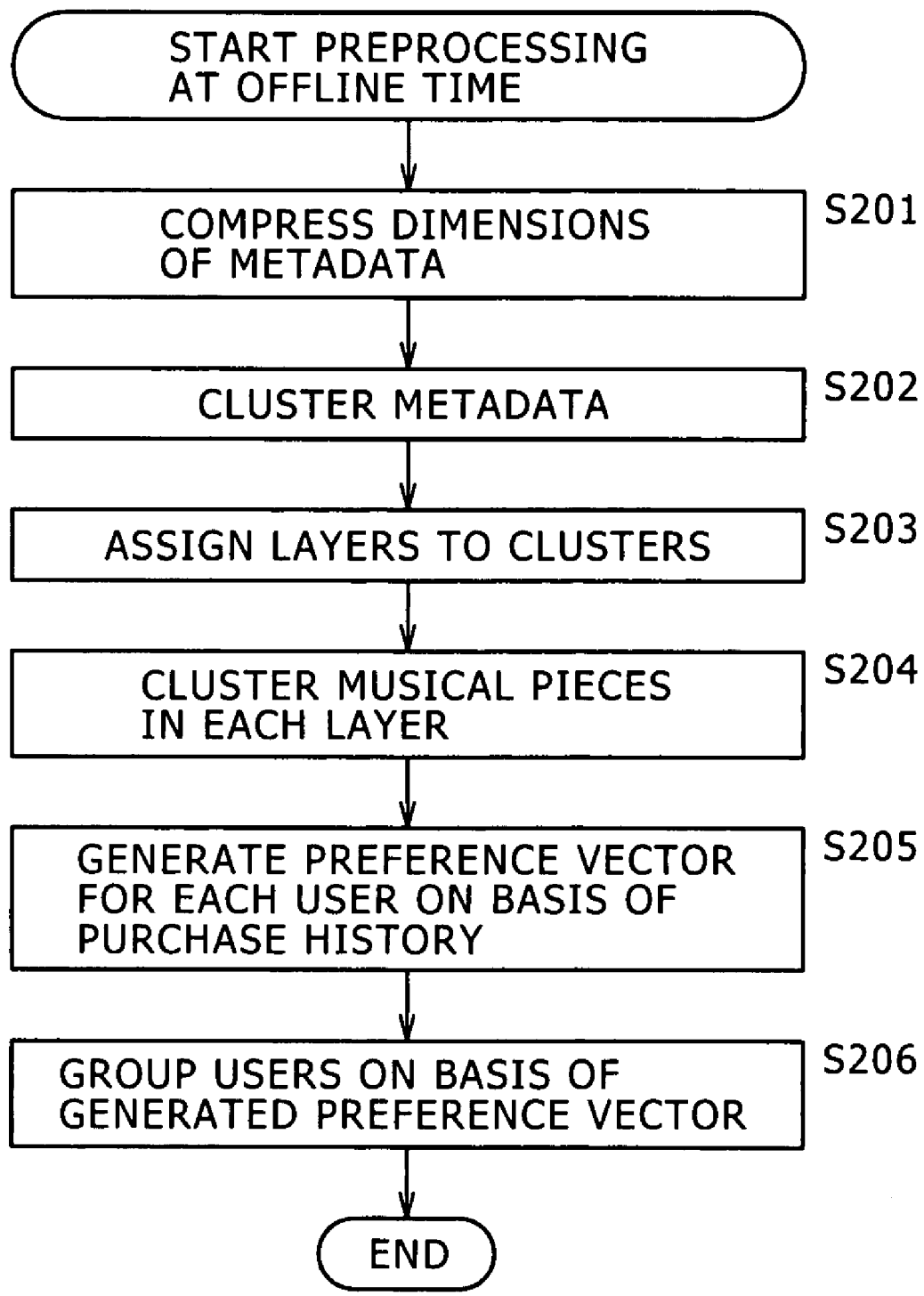
FIG. 14 is a flowchart of assistance in explaining another example of preprocessing at an offline time.

Another example of preprocessing at an offline time as preparation for a process of recommending a musical piece in the recommendation system 1 shown in FIG. 13 will next be described with reference to a flowchart of FIG. 14.

In step S201, the metadata clustering unit 201 obtains the metadata of a musical piece from the musical piece DB 11, and compresses dimensions of the obtained metadata. For example, in step S201, the metadata clustering unit 201 compresses the dimensions of the metadata of the musical piece obtained from the musical piece DB 11 by a method such as LSA (the latent semantic analysis), PLSA (the probabilistic latent semantic analysis), a quantification method III or the like.

Incidentally, in step S201, the metadata clustering unit 201 may vectorize the metadata of the musical piece.

In step S202, the metadata clustering unit 201 clusters the metadata of each musical piece. For example, in step S202, the metadata clustering unit 201 soft clusters the metadata of each musical piece.

More specifically, as shown in FIG. 15, for example, the metadata clustering unit 201 soft clusters the metadata of each musical piece such that a sum of weights of belonging of an item to clusters within each layer is one.

For example, weights of belonging to a first cluster, a second cluster, a third cluster, and a fourth cluster in a first layer of metadata of a musical piece identified by a musical piece ID of ABC123 are 0.0, 0.8, 0.0, and 0.2, respectively. Weights of belonging to a fifth cluster, a sixth cluster, a seventh cluster, and an eighth cluster in a second layer of the metadata of the musical piece identified by the musical piece ID of ABC123 are 0.4, 0.6, 0.0, and 0.0, respectively. Weights of belonging to a ninth cluster, a tenth cluster, and an eleventh cluster in a third layer of the metadata of the musical piece identified by the musical piece ID of ABC123 are 0.0, 0.0, and 1.0, respectively. Weights of belonging to four clusters in an nth layer of the metadata of the musical piece identified by the musical piece ID of ABC123 are 1.0, 0.0, 0.0, and 0.0, respectively.

For example, weights of belonging to the first cluster, the second cluster, the third cluster, and the fourth cluster in a first layer of metadata of a musical piece identified by a musical piece ID of CTH863 are 1.0, 0.0, 0.0, and 0.0, respectively. Weights of belonging to the fifth cluster, the sixth cluster, the seventh cluster, and the eighth cluster in a second layer of the metadata of the musical piece identified by the musical piece ID of CTH863 are 0.0, 0.5, 0.5, and 0.0, respectively. Weights of belonging to the ninth cluster, the tenth cluster, and the eleventh cluster in a third layer of the metadata of the musical piece identified by the musical piece ID of CTH863 are 0.7, 0.3, and 0.0, respectively. Weights of belonging to the four clusters in an nth layer of the metadata of the musical piece identified by the musical piece ID of CTH863 are 0.0, 0.8, 0.2, and 0.0, respectively.

For example, weights of belonging to the first cluster, the second cluster, the third cluster, and the fourth cluster in a first layer of metadata of a musical piece identified by a musical piece ID of XYZ567 are 0.0, 0.4, 0.6, and 0.0, respectively. Weights of belonging to the fifth cluster, the sixth cluster, the seventh cluster, and the eighth cluster in a second layer of the metadata of the musical piece identified by the musical piece ID of XYZ567 are 0.0, 0.0, 0.0, and 1.0, respectively. Weights of belonging to the ninth cluster, the tenth cluster, and the eleventh cluster in a third layer of the metadata of the musical piece identified by the musical piece ID of XYZ567 are 0.9, 0.0, and 0.1, respectively. Weights of belonging to the four clusters in an nth layer of the metadata of the musical piece identified by the musical piece ID of XYZ567 are 0.3, 0.0, 0.0, and 0.7, respectively.

Incidentally, the soft clustering of the metadata of each musical piece is not limited to soft clustering such that a sum of weights of belonging of an item, that is, a musical piece to clusters within each layer is one. In addition, items may not belong to any cluster in layers.

In step S203, the metadata clustering unit 201 assigns cluster layers.

The clustering of metadata and assignment of cluster layers will be described below with reference to FIG. 16 and FIG. 17. FIG. 16 is a diagram showing an example of metadata. The metadata shown in FIG. 16 is categorical data having a value of either zero or one for simplicity.

Metadata 1, metadata 2, and metadata 3 belong to a meta-group 1 as a higher-order classification. Metadata 4, metadata 5, and metadata 6 belong to a meta-group 2 as a higher-order classification. For example, metadata about artists belongs to the meta-group 1. The metadata 1 represents external appearances of artists. The metadata 2 represents groups. For example, metadata about genres belongs to the meta-group 2. The metadata 4 represents pops. The metadata 5 represents rock music.

In the example shown in FIG. 16, the pieces of metadata 1 to 6 of the musical piece identified by the musical piece ID of ABC123 are 1, 1, 1, 1, 1, and 1, respectively. The pieces of metadata 1 to 6 of the musical piece identified by the musical piece ID of CTH863 are 0, 1, 0, 0, 1, and 1, respectively. The pieces of metadata 1 to 6 of the musical piece identified by the musical piece ID of XYZ567 are 1, 1, 1, 1, 1, and 1, respectively. The pieces of metadata 1 to 6 of a musical piece identified by a musical piece ID of EKF534 are 1, 0, 1, 0, 0, and 1, respectively. The pieces of metadata 1 to of a musical piece identified by a musical piece ID of OPQ385 are 1, 0, 1, 1, 0, and 0, respectively.

The metadata 1 of the musical pieces identified by the musical piece IDs of ABC123 to OPQ385 is regarded as a vector. Similarly, each of the metadata 2 to 6 of the musical pieces identified by the musical piece IDs of ABC123 to OPQ385 is regarded as a vector. That is, the values of one piece of metadata of the plurality of musical pieces are regarded as a vector.

Attention is directed to distances between the vectors.

In the example shown in FIG. 16, the metadata 1, the metadata 3, and the metadata 4 are brought together in a cluster of a Manhattan distance of one or less. The metadata 2, the metadata 5, and the metadata 6 are brought together in another cluster of a Manhattan distance of one or less.

Accordingly, these clusters are set as a new metadata hierarchy. That is, closer metadata is assigned to each layer of the hierarchy.

FIG. 17 shows an example of the metadata thus clustered and assigned to layers. In the example shown in FIG. 17, the metadata 1, the metadata 3, and the metadata belong to a first layer. The metadata 2, the metadata 5, and the metadata 6 belong to a second layer.

Thus, each layer is formed by a group of highly correlated metadata, and contents are clustered in the layer. It is therefore possible to reflect in clusters subtle differences between contents which differences cannot be expressed by ordinary layering that sets genres, artists and the like as layers as they are.

Returning to FIG. 14, in step S204, the musical piece clustering unit 202 clusters musical pieces in each layer. That is, the musical piece clustering unit 202 classifies each content into one of a plurality of clusters in each of the assigned layers.

Step S205 and step S206 are the same as step S2 and step S3, respectively, in FIG. 6, and therefore description thereof will be omitted.

Thus, it is possible to cluster contents with a reduced amount of data and a reduced amount of calculation while maintaining detailedness of expression (a degree of detailedness of expression) of contents by metadata.

In addition, by layering metadata as described above, it is possible to cluster contents such that subtle differences between contents are expressed well.

Details of the similar user detecting unit 203 will next be described.

Figure 18:
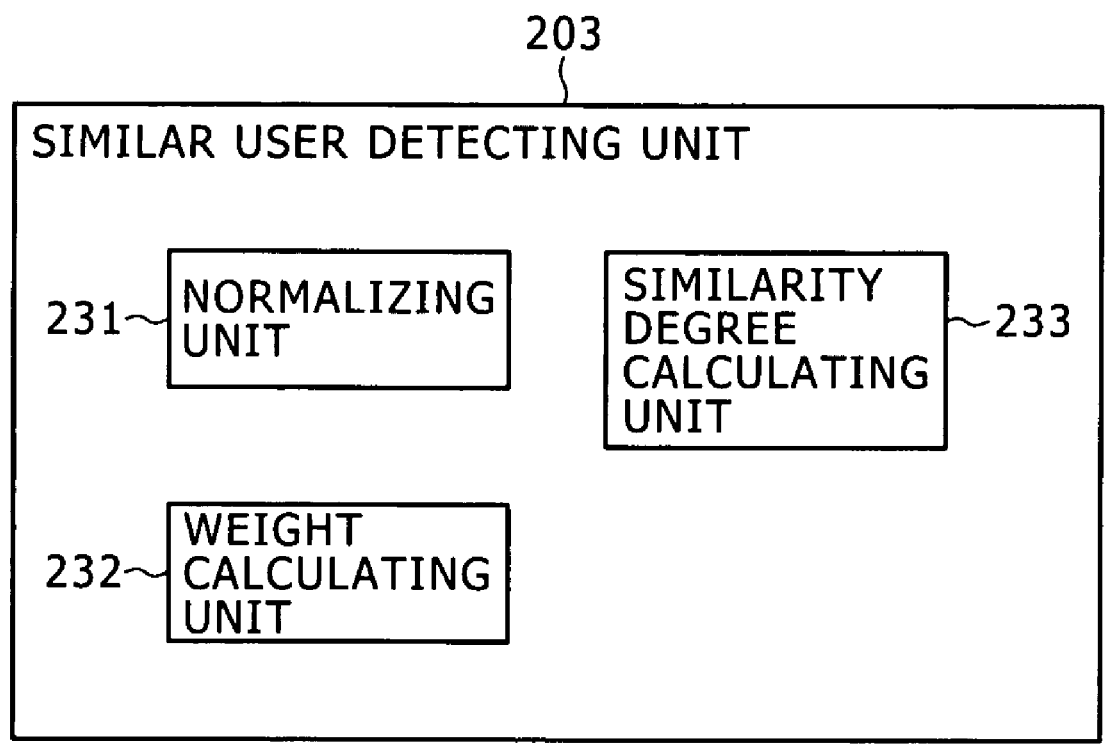
FIG. 18 is a block diagram showing an example of configuration of a similar user detecting unit.

FIG. 18 is a block diagram showing an example of configuration of the similar user detecting unit 203. The similar user detecting unit 203 includes a normalizing unit 231, a weight calculating unit 232, and a similarity degree calculating unit 233.

The normalizing unit 231 normalizes preference vectors as an example of user preference information. The weight calculating unit 232 calculates a weight of each layer for each user from the normalized preference vector of each user. The similarity degree calculating unit 233 calculates a degree of similarity indicating a degree of similarity of preferences between a user to whom to recommend a musical piece and another user, from the weight of each layer and the preference vector.

Figure 19:
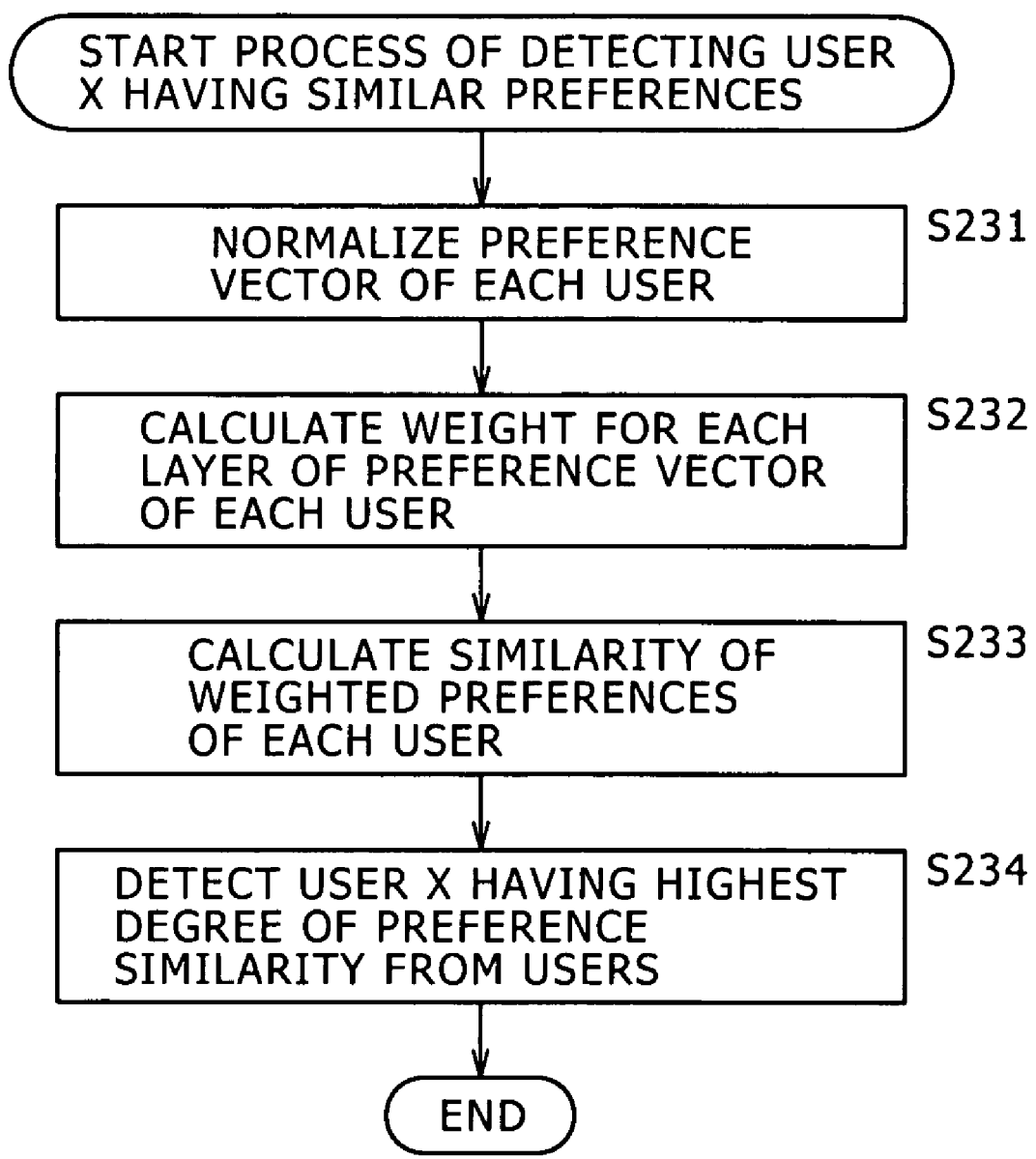
FIG. 19 is a flowchart of assistance in explaining a process of detecting a user X having similar preferences.

A process of detecting a user X having similar preferences by the similar user detecting unit 203, which process corresponds to step S21 in FIG. 8, will next be described with reference to a flowchart of FIG. 19.

In step S231, the normalizing unit 231 normalizes the preference vector of each user.

The normalization of the preference vector will be described with reference to FIG. 20 and FIG. 21. FIG. 20 is a diagram showing an example of preference vectors of users which preference vectors are generated in the preference vector generating unit 19 and retained in the user history information DB 17. That is, FIG. 20 shows an example of preference vectors before being normalized.

Of elements of the preference vectors shown in FIG. 20, first four elements belong to a first layer, next four elements belong to a second layer, further three elements belong to a third layer, and last four elements belong to a fourth layer.

In the example shown in FIG. 20, the preference vector of a user identified by a user ID of U001 is (0.0, 2.8, 0.0, 2.2, 0.4, 0.6, 0.8, 0.0, 0.5, 0.4, 0.4, 0.0, 0.5, 0.4, and 0.0). In this case, first four elements of 0.0, 2.8, 0.0, and 2.2 belong to the first layer, next four elements of 0.4, 0.6, 0.8, and 0.0 belong to the second layer, further three elements of 0.5, 0.4, and 0.4 belong to the third layer, and last four elements of 0.0, 0.5, 0.4, and 0.0 belong to the fourth layer.

In the example shown in FIG. 20, the preference vector of a user identified by a user ID of U002 is (0.2, 0.8, 0.5, 0.6, 0.0, 0.5, 0.5, 0.0, 0.7, 0.3, 0.6, 0.0, 0.6, 0.2, and 0.0). In this case, first four elements of 0.2, 0.8, 0.5, and 0.6 belong to the first layer, next four elements of 0.0, 0.5, 0.5, and 0.0 belong to the second layer, further three elements of 0.7, 0.3, and 0.6 belong to the third layer, and last four elements of 0.0, 0.6, 0.2, and 0.0 belong to the fourth layer.

In the example shown in FIG. 20, the preference vector of a user identified by a user ID of U003 is (0.0, 2.2, 0.1, 1.6, 0.0, 1.0, 2.0, 1.4, 0.0, 1.2, 0.1, 0.3, 0.4, 0.6, and 0.7). In this case, first four elements of 0.0, 2.2, 0.1, and 1.6 belong to the first layer, next four elements of 0.0, 1.0, 2.0, and 1.4 belong to the second layer, further three elements of 0.0, 1.2, and 0.1 belong to the third layer, and last four elements of 0.3, 0.4, 0.6, and 0.7 belong to the fourth layer.

For example, in step S231, the normalizing unit 231 normalizes each preference vector such that a norm in each layer is one.

FIG. 21 is a diagram showing an example of preference vectors obtained by normalizing the preference vectors in FIG. 20 such that a norm in each layer is one.

In the example shown in FIG. 21, the normalized preference vector of the user identified by the user ID of U001 is (0.0, 0.8, 0.0, 0.6, 0.4, 0.6, 0.7, 0.0, 0.7, 0.5, 0.5, 0.0, 0.5, 0.4, and 0.0). In this case, first four elements of 0.0, 0.8, 0.0, and 0.6 belong to the first layer, next four elements of 0.4, 0.6, 0.7, and 0.0 belong to the second layer, further three elements of 0.7, 0.5, and 0.5 belong to the third layer, and last four elements of 0.0, 0.5, 0.4, and 0.0 belong to the fourth layer.

In the example shown in FIG. 21, the normalized preference vector of the user identified by the user ID of U002 is (0.2, 0.7, 0.4, 0.5, 0.0, 0.7, 0.7, 0.0, 0.7, 0.3, 0.6, 0.0, 0.8, 0.3, and 0.0). In this case, first four elements of 0.2, 0.7, 0.4, and 0.5 belong to the first layer, next four elements of 0.0, 0.7, 0.7, and 0.0 belong to the second layer, further three elements of 0.7, 0.3, and 0.6 belong to the third layer, and last four elements of 0.0, 0.8, 0.3, and 0.0 belong to the fourth layer.

In the example shown in FIG. 21, the normalized preference vector of the user identified by the user ID of U003 is (0.0, 0.8, 0.0, 0.6, 0.0, 0.4, 0.8, 0.5, 0.0, 1.0, 0.1, 0.3, 0.2, 0.2, and 0.3). In this case, first four elements of 0.0, 0.8, 0.0, and 0.6 belong to the first layer, next four elements of 0.0, 0.4, 0.8, 0.5 belong to the second layer, further three elements of 0.0, 1.0, and 0.1 belong to the third layer, and last four elements of 0.3, 0.2, 0.2, and 0.3 belong to the fourth layer.

Returning to FIG. 19, in step S232, the weight calculating unit 232 calculates a weight of each layer of the preference vector of each user. For example, in step S232, the weight calculating unit 232 calculates, for each layer, a weight as a variance of elements belonging to one layer.

FIG. 22 is a diagram showing an example of a weight as a variance of elements belonging to each layer, which weight is calculated for each layer of each user. In the example shown in FIG. 22, the weight of the first layer, the weight of the second layer, the weight of the third layer, and the weight of the fourth layer of the user identified by the user ID of U001 are 0.17, 0.10, 0.01, and 0.06.

The weight of the first layer, the weight of the second layer, the weight of the third layer, and the weight of the fourth layer of the user identified by the user ID of U002 are 0.05, 0.17, 0.05, and 0.16. The weight of the first layer, the weight of the second layer, the weight of the third layer, and the weight of the fourth layer of the user identified by the user ID of U003 are 0.16, 0.10, 0.31, and 0.00.

In step S233, the similarity degree calculating unit 233 calculates a degree of similarity of weighted preferences of each user. In step S234, the similar user detecting unit 203 detects a user X having a highest degree of preference similarity from the users. Then the process is ended.

Supposing that the degrees of similarity sim(u,v) of a user u and a user v are calculated by Equation (1) without weighting, and that a user X is the user identified by the user ID of U001, the degrees of similarity of the user identified by the user ID of U002 and the user identified by the user ID of U003 are as shown in FIG. 23.

[Equation 1]

$$sim(u, v) = \sum_{l \in L} \sum_{c \in C(l)} h_{ulc} h_{vlc} \qquad (1)$$

In Equation (1), L is a value indicating the number of layers of the preference vector, l is a value identifying a layer of the preference vector, C(l) denotes the whole of clusters of the preference vector, c is a value identifying a cluster, and h denotes a value of an element of the normalized preference vector.

When the elements of the first layer among the elements of the preference vector of the user identified by the user ID of U001 are multiplied by the corresponding elements of the first layer among the elements of the preference vector of the user identified by the user ID of U002, and results of the multiplication are added up, 0.88 as a value disposed in the first layer of the user ID of U002 in FIG. 23 is obtained. Similarly, when the elements of the second layer, the third layer, and the fourth layer among the elements of the preference vector of the user identified by the user ID of U001 are multiplied by the corresponding elements of the second layer, the third layer, and the fourth layer among the elements of the preference vector of the user identified by the user ID of U002, and results of the multiplication are added up, 0.92, 0.97, and 0.50 as values disposed in the second layer, the third layer, and the fourth layer of the user ID of U002 in FIG. 23 are obtained.

Finally, a degree of similarity of preferences between the user identified by the user ID of U001 and the user identified by the user ID of U002 is 3.27, which is a value resulting from addition of 0.88, 0.92, 0.97, and 0.50 obtained for the first layer, the second layer, the third layer, and the fourth layer, respectively.

Similarly, when the elements of the first layer among the elements of the preference vector of the user identified by the user ID of U001 are multiplied by the corresponding elements of the first layer among the elements of the preference vector of the user identified by the user ID of U003, and results of the multiplication are added up, 1.00 as a value disposed in the first layer of the user ID of U003 in FIG. 23 is obtained. Similarly, when the elements of the second layer, the third layer, and the fourth layer among the elements of the preference vector of the user identified by the user ID of U001 are multiplied by the corresponding elements of the second layer, the third layer, and the fourth layer among the elements of the preference vector of the user identified by the user ID of U003, and results of the multiplication are added up, 0.77, 0.57, and 0.15 as values disposed in the second layer, the third layer, and the fourth layer of the user ID of U003 in FIG. 23 are obtained.

Finally, a degree of similarity of preferences between the user identified by the user ID of U001 and the user identified by the user ID of U003 is 2.50, which is a value resulting from addition of 1.00, 0.77, 0.57, and 0.15 obtained for the first layer, the second layer, the third layer, and the fourth layer, respectively.

When the degrees of similarity are thus calculated without weighting, the degree of similarity between the user identified by the user ID of U001 and the user identified by the user ID of U002 is higher than the degree of similarity between the user identified by the user ID of U001 and the user identified by the user ID of U003. Hence, the user identified by the user ID of U002 is detected as user X having a highest degree of similarity of preferences.

On the other hand, in step S233, the similarity degree calculating unit 233 calculates the degrees of similarity sim(u,v) of the user u and the user v, the degrees of similarity sim(u,v) being weighted by Equation (2).

[Equation 2]

$$sim(u, v) = \sum_{l \in L} \sum_{c \in C(l)} b_{ul} h_{ulc} \cdot b_{vl} h_{vlc} \quad (2)$$

In Equation (2), L is a value indicating the number of layers of the preference vector, l is a value identifying a layer of the preference vector, C(l) denotes the whole of clusters of the preference vector, c is a value identifying a cluster, h denotes a value of an element of the normalized preference vector, and b denotes a weight of each layer.

FIG. 24 is a diagram showing an example of the weighted degrees of similarity of the user identified by the user ID of U002 and the user identified by the user ID of U003 when a user X is the user identified by the user ID of U001. Incidentally, values shown in FIG. 24 are 100 times the degrees of similarity sim(u,v) calculated by Equation (2).

When each of the elements of the first layer among the elements of the preference vector of the user identified by the user ID of U001 is multiplied by the weight of the first layer of the user identified by the user ID of U001, each of the elements of the first layer among the elements of the preference vector of the user identified by the user ID of U002 is multiplied by the weight of the first layer of the user identified by the user ID of U002, the corresponding elements are multiplied together, and results of the multiplication are added up, 0.72 as a value disposed in the first layer of the user ID of U002 in FIG. 24 is obtained.

Similarly, when each of the elements of the second layer, the third layer, and the fourth layer among the elements of the preference vector of the user identified by the user ID of 0001 is multiplied by the weight of the first layer, the second layer, the third layer and the fourth layer of the user identified by the user ID of 0001, each of the elements of the second layer, the third layer, and the fourth layer among the elements of the preference vector of the user identified by the user ID of 0002 is multiplied by the weight of the first layer of the user identified by the user ID of 0002, the corresponding elements are multiplied together, and results of the multiplication are added up, 1.54, 0.03, and 0.48 as values disposed in the second layer, the third layer, and the fourth layer of the user ID of 0002 in FIG. 24 are obtained.

Finally, a weighted degree of similarity of preferences between the user identified by the user ID of U001 and the user identified by the user ID of U002 is 2.76, which is a value resulting from addition of 0.72, 1.54, 0.03, and 0.48 obtained for the first layer, the second layer, the third layer, and the fourth layer, respectively.

Similarly, when each of the elements of the first layer among the elements of the preference vector of the user identified by the user ID of 0001 is multiplied by the weight of the first layer of the user identified by the user ID of 0001, each of the elements of the first layer among the elements of the preference vector of the user identified by the user ID of 0003 is multiplied by the weight of the first layer of the user identified by the user ID of 0003, the corresponding elements are multiplied together, and results of the multiplication are added up, 2.74 as a value disposed in the first layer of the user ID of 0003 in FIG. 24 is obtained. Similarly, when each of the elements of the second layer, the third layer, and the fourth layer among the elements of the preference vector of the user identified by the user ID of 0001 is multiplied by the weight of the first layer, the second layer, the third layer and the fourth layer of the user identified by the user ID of 0001, each of the elements of the second layer, the third layer, and the fourth layer among the elements of the preference vector of the user identified by the user ID of 0003 is multiplied by the weight of the first layer of the user identified by the user ID of 0003, the corresponding elements are multiplied together, and results of the multiplication are added up, 0.79, 0.10, and 0.00 as values disposed in the second layer, the third layer, and the fourth layer of the user ID of 0003 in FIG. 24 are obtained.

Finally, a weighted degree of similarity of preferences between the user identified by the user ID of U001 and the user identified by the user ID of U003 is 3.64, which is a value resulting from addition of 2.74, 0.79, 0.10, and 0.00 obtained for the first layer, the second layer, the third layer, and the fourth layer, respectively.

As a result, when the degrees of similarity are calculated with weighting performed, the degree of similarity between the user identified by the user ID of U001 and the user identified by the user ID of U003 is higher than the degree of similarity between the user identified by the user ID of U001 and the user identified by the user ID of U002. Hence, the user identified by the user ID of U003 is detected as user X having a highest degree of similarity of preferences.

Directing attention to the preference vectors shown in FIG. 20, the values of elements of the preference vector of the user identified by the user ID of U001 vary more greatly in the first layer than in the second to fourth layers. It is therefore estimated that the values of the elements in the first layer are more closely related to the preferences of the user identified by the user ID of U001 than those in the second to fourth layers.

Directing attention to the values of elements in the first layer of the preference vector of the user identified by the user ID of U002 and the preference vector of the user identified by the user ID of U003, the values of the elements in the first layer of the preference vector of the user identified by the user ID of U003 are closer to the values of the elements in the first layer of the preference vector of the user identified by the user ID of U001 than the values of the elements in the first layer of the preference vector of the user identified by the user ID of U002. It is therefore estimated that as compared with the user identified by the user ID of U002, the user identified by the user ID of U003 has more similar preferences to those of the user identified by the user ID of U001.

Thus, by performing weighting, on the basis of values estimated to be more closely related to the preferences of a user than values estimated to be remotely related to the preferences of the user, it is possible to obtain a degree of similarity of preferences with the closely related values varying more greatly. Therefore the user having similar preferences can be detected more accurately.

It is to be noted that while in the description above, the weight calculating unit 232 calculates a weight as a variance of elements belonging to each layer, for example, in step S232, the present invention is not limited to this, and it suffices to calculate a weight that has a greater value as variations of the elements in the layer are increased. For example, entropy H may be calculated by Equation (3), and a weight as a value obtained as a result of subtracting the entropy H from one may be calculated.

[Equation 3]

$$H_{(l)} = \sum_{c \in C(l)} h_{lc} \log h_{lc} \qquad (3)$$

Thus, it is possible to reduce an amount of calculation for selecting an appropriate content while minimizing a loss of information. It is also possible to represent a content that surely reflects information to which a user directs attention in selecting a content.

It is to be noted that in the present specification, the steps performed on the basis of the program include not only processes carried out in time series in the described order but also processes carried out in parallel or individually and not necessarily in time series.

The program may be processed by a single computer, or may be subjected to distributed processing by a plurality of computers. Further, the program may be transferred to a remote computer and then executed.

A system in the present specification refers to an apparatus as a whole formed by a plurality of devices.

It is to be noted that embodiments of the present invention are not limited to the foregoing embodiments, and that various changes can be made without departing from the spirit of the present invention.

The invention claimed is:

1. An information processing device for selecting a content satisfying a predetermined condition from a group of contents, and presenting the content to a first user, the information processing device, comprising:
 a processor configured for:
  classifying content, included in a group of contents, into one of a plurality of clusters included in layers arranged based on metadata of the content, the layers being assigned priority levels including a high priority level and a low priority level;
  retaining a database indicating a correspondence between the classified content, the clusters corresponding to the classified content, and the layers including the corresponding clusters;
  managing history information based on content classified in the group of contents, and used by the first user;
  identifying one of the clusters on a basis of the history information, and selecting a content classified into one of the layers of the identified cluster, the selection being based on a priority level of the one layer, wherein the priority level of the one layer is the high priority level;
  generating preference information indicating a preference of the first user as a preference vector having a dimension, the preference information being generated based on history information of the first user and the database, wherein a value is added to the dimension of the preference vector based on the history information, the magnitude of the value being selected based on a type of transaction by the first user;
  generating a binarized preference vector based on the preference vector;
  determining a novelty level of the selected content based on a degree of overlap between the identified cluster and the binarized preference vector of the first user, wherein the degree of overlap is compared with a predetermined rate to determine the novelty level;
  generating description information based on the novelty level, the description information indicating a reason for selection of the selected content;
  detecting a second user having a similar preference as the preference information of the first user;
  identifying a cluster on a basis of the preference information of the first user and the preference information of the second user;
  extracting a content classified into the cluster identified based on the preference information of the first user and the preference information of the second user, wherein the presenting means presents the extracted content to the first user;
  normalizing the preference information of the first user;
  calculating a weight of the one layer having a content of the first user based on the normalized preference information;
  calculating a degree of similarity indicating the degree of similarity between the preference of the first user and a preference of another user based on the weight, wherein the another user is identified to be the second user based on the similar preferences; and
 a display device for presenting the selected content and the description information.

2. The information processing device as claimed in claim 1, wherein the processor is further configured for:
 detecting a second user having history information similar to the history information of the first user;
 identifying one of the clusters having a content selected from the group of contents and indicated in the history information of the second user, wherein the selected content is not indicated in the history information of the first user; and
 extracting the identified content not indicated in the history information of the first user, wherein the means for presenting presents the extracted content to the first user.

3. The information processing device as claimed in claim 1, wherein the processor is further configured for:
grouping users on a basis of the preference information;
detecting a second user belonging to a same group as the first user;
identifying one of the clusters having a content selected from the group of contents and indicated in the history information of the second user, wherein the selected content is not indicated in the history information of the first user; and
extracting the identified content not indicated in the history information of the first user, wherein the means for presenting presents the extracted content to the first user.

4. The information processing device as claimed in claim 1, wherein the processor is further configured for:
grouping users on a basis of the preference information;
detecting a second user belonging to a same group as a first user;
identifying one of the clusters on a basis of preference information of the first user and preference information of the second user; and
extracting a content classified into the one identified cluster, wherein the presenting means presents the extracted content to the first user.

5. The information processing device as claimed in claim 1, wherein the processor is further configured for setting a keywords for the clusters, wherein the description information includes one of the keywords.

6. The information processing device as claimed in claim 1, wherein the processor is further configured for classifying the metadata of contents into a plurality of metadata clusters, and arranging the metadata clusters in the layers.

7. The information processing device as claimed in claim 1, wherein the selected content is included into a plurality of the clusters, the preference information indicating a number of clusters the selected content is included in.

8. An information processing method of an information processing device for selecting a content satisfying a predetermined condition from a group of contents, and presenting the content to a user, the information processing method comprising the steps of:
classifying content included in a group of contents, into one of a plurality of clusters included in layers arranged based on metadata of the contents, the layers being assigned priority levels including a high priority level and low priority level;
retaining a database indicating a correspondence between the classified content, the clusters corresponding to the classified content, and the layers including the corresponding clusters;
managing history information based on content classified in the group of contents, and used by the first user;
identifying one of the clusters on a basis of the history information, and selecting a content classified into one of the layers of the identified cluster, the selection being based on a priority level of the one layer, wherein the priority level of the one layer is the high priority level;
generating preference information indicating a preference of the first user as a preference vector having a dimension, the preference information being generated based on history information of the first user and the database, wherein a value is added to the dimension of the preference vector based on the history information, the magnitude of the value being selected based on a type of transaction by the first user;
generating a binarized preference vector based on the preference vector;
determining a novelty level of the selected content based on a degree of overlap between the identified cluster and the binarized preference vector of the user, wherein the degree of overlap is compared with a predetermined rate to determine the novelty level;
generating description information based on the novelty level, the description information indicating a reason for selection of the selected content;
presenting, on a display of the information processing device, the selected content and the description information;
detecting a second user having a similar preference as the preference information of the first user;
identifying a cluster on a basis of the preference information of the first user and the preference information of the second user;
extracting a content classified into the cluster identified based on the preference information of the first user and the preference information of the second user, wherein the presenting means presents the extracted content to the first user;
normalizing the preference information of the first user;
calculating a weight of the one layer having a content of the first user based on the normalized preference information; and
calculating a degree of similarity indicating the degree of similarity between the preference of the first user and a preference of another user based on the weight, wherein the another user is identified to be the second user based on the similar preferences.

9. A non-transitory computer-readable storage medium storing a program which, when executed on a processor, causes the processor to perform a method for selecting a content satisfying a predetermined condition from a group of contents, and recommending the content to a user, the method comprising the steps of:
classifying content included in a group of contents, into one of a plurality of clusters included in layers arranged based on metadata of the contents, the layers being assigned priority levels including a high priority level and low priority level;
retaining a database indicating a correspondence between the classified content, the clusters corresponding to the classified content, and the layers including the corresponding clusters;
managing history information based on content classified in the group of contents, and used by the first user;
identifying one of the clusters on a basis of the history information, and selecting a content classified into one of the layers of the identified cluster, the selection being based on a priority level of the one layer, wherein the priority level of the one layer is the high priority level;
generating preference information indicating a preference of the first user as a preference vector having a dimension, the preference information being generated based on history information of the first user and the database, wherein a value is added to the dimension of the preference vector based on the history information, the magnitude of the value being selected based on a type of transaction by the first user;
generating a binarized preference vector based on the preference vector;
determining a novelty level of the selected content based on a degree of overlap between the identified cluster and the binarized preference vector of the user, wherein the degree of overlap is compared with a predetermined rate to determine the novelty level;

generating description information based on the novelty level, the description information indicating a reason for selection of the selected content;

presenting the selected content and the description information;

detecting a second user having a similar preference as the preference information of the first user;

identifying a cluster on a basis of the preference information of the first user and the preference information of the second user;

extracting a content classified into the cluster identified based on the preference information of the first user and the preference information of the second user, wherein the presenting means presents the extracted content to the first user;

normalizing the preference information of the first user;

calculating a weight of the one layer having a content of the first user based on the normalized preference information; and calculating a degree of similarity indicating the degree of similarity between the preference of the first user and a preference of another user based on the weight, wherein the another user is identified to be the second user based on the similar preferences.

* * * * *